US007412721B2

(12) United States Patent
Torii et al.

(10) Patent No.: US 7,412,721 B2
(45) Date of Patent: Aug. 12, 2008

(54) METHOD OF AND SYSTEM FOR MANAGING INFORMATION, AND COMPUTER PRODUCT

(75) Inventors: Satoru Torii, Kawasaki (JP); Masashi Mitomo, Kawasaki (JP); Seigo Kotani, Kawasaki (JP); Fumie Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 756 days.

(21) Appl. No.: 09/955,972

(22) Filed: Sep. 20, 2001

(65) Prior Publication Data
US 2002/0116631 A1 Aug. 22, 2002

(30) Foreign Application Priority Data
Dec. 20, 2000 (JP) ............................. 2000-387880

(51) Int. Cl.
*G06F 11/00* (2006.01)
(52) U.S. Cl. ............................. 726/22; 726/23; 726/24; 726/25
(58) Field of Classification Search .................. 713/201; 726/22–25
See application file for complete search history.

(56) References Cited
U.S. PATENT DOCUMENTS
6,134,664 A 10/2000 Walker
6,408,391 B1 * 6/2002 Huff et al. .................... 713/201

FOREIGN PATENT DOCUMENTS
WO WO99/57625 11/1999

OTHER PUBLICATIONS
Lunt et al., "Knowledge-Based Intrusion Detection", AI Systems in Government Conference, 1989, Proceedings of the Annual Washington, DC, Mar. 17-31, 1989, pp. 102-107.
Debar et al., "Towards a Taxonomy of Intrusion-Detection Systems" Computer Networks 31, 1999, pp. 805-822.

* cited by examiner

*Primary Examiner*—Kambiz Zand
*Assistant Examiner*—Jacob Lipman
(74) *Attorney, Agent, or Firm*—Staas & Halsey LLP

(57) ABSTRACT

The system includes the monitor agent that analyzes log of an entity. When an abnormality is detected, the monitor agent notifies about the abnormality to the control manager. The control manager decides a countermeasure and a countermeasure request party from the database and informs them to the action agent which the countermeasure request party. The action agent implements the countermeasure.

41 Claims, 37 Drawing Sheets

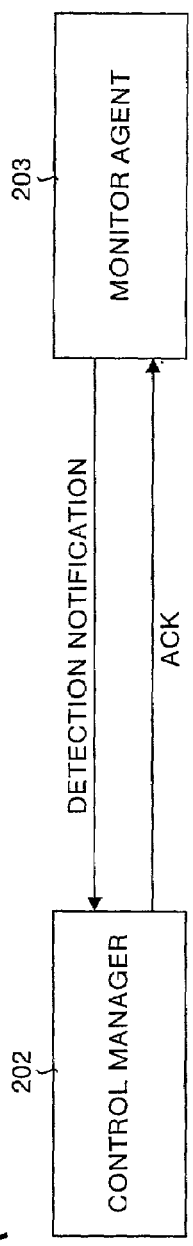

FIG.28A

| EVENT IDENTIFIER | DAMAGE IDENTIFIER |
|---|---|
| EVENT 001 | DAMAGE EXISTS |

FIG.28B

COUNTERMEASURE RULES

| EVENT IDENTIFIER | THREAT IDENTIFIER | COUNTER-MEASURE IDENTIFIER | COUNTER-MEASURE DESIGNATOR |
|---|---|---|---|
| EVENT 001 | THREAT 001 | COUNTER-MEASURE 001 | SERVER |
| EVENT 001 | THREAT 001 | COUNTER-MEASURE 002 | FW |
| EVENT 002 | THREAT 001 | COUNTER-MEASURE 001 | SERVER |
| EVENT 002 | THREAT 001 | COUNTER-MEASURE 002 | FW |
| EVENT 003 | THREAT 010 | COUNTER-MEASURE 011 | SERVER |
| EVENT 003 | THREAT 010 | COUNTER-MEASURE 012 | SERVER |
| EVENT 003 | THREAT 010 | COUNTER-MEASURE 012 | FW |
| ... | ... | ... | ... |

FIG.28C

COUNTERMEASURE PLANS

| EVENT IDENTIFIER | THREAT IDENTIFIER | COUNTER-MEASURE IDENTIFIER |
|---|---|---|
| DAMAGE EXISTS | THREAT 001 | COUNTER-MEASURE 001 |
| DAMAGE UNCLEAR | THREAT 001 | COUNTER-MEASURE 002 |
| NO DAMAGE | THREAT 001 | — |
| DAMAGE EXISTS | THREAT 002 | COUNTER-MEASURE 011 |
| DAMAGE UNCLEAR | THREAT 002 | — |
| NO DAMAGE | THREAT 002 | — |
| ... | ... | ... |

FIG.28D

COUNTERMEASURE RULES

| EVENT IDENTIFIER | THREAT IDENTIFIER | COUNTER-MEASURE IDENTIFIER | COUNTER-MEASURE DESIGNATOR |
|---|---|---|---|
| EVENT 001 | THREAT 001 | COUNTER-MEASURE 001 | SERVER |
| EVENT 001 | THREAT 001 | COUNTER-MEASURE 002 | FW |
| EVENT 002 | THREAT 001 | COUNTER-MEASURE 001 | SERVER |
| EVENT 002 | THREAT 001 | COUNTER-MEASURE 002 | FW |
| EVENT 003 | THREAT 010 | COUNTER-MEASURE 011 | SERVER |
| EVENT 003 | THREAT 010 | COUNTER-MEASURE 012 | SERVER |
| EVENT 003 | THREAT 010 | COUNTER-MEASURE 012 | FW |
| ... | ... | ... | ... |

FIG.31

| ATTRIBUTE | | EXPLANATION |
|---|---|---|
| CONTROL MANAGER | ID | THE CONTROL MANAGER ASSIGNS AT THE TIME OF OBJECT DEFINITION |
| | IP ADDRESS | INFORMATION TO BECOME NECESSARY IN COMMUNICATION FROM AN AGENT TO THE CONTROL MANAGER. TWO PORT NUMBERS EXIST FOR THE MONITOR AGENT AND THE ACTION AGENT |
| | PORT NUMBER (1) | |
| | PORT NUMBER (2) | |
| | COMMUNICATION TIMEOUT VALUE | |
| | THE NUMBER OF COMMUNICATION RETRIES | |
| COUNTER-MEASURE RULE | FILE NAME (PLURAL NAMES ALLOWED) | SPECIFY THE PATH TO THE COUNTERMEASURE RULE FILE |
| COUNTER-MEASURE PLAN | FILE NAME | SPECIFY THE PATH TO THE COUNTERMEASURE PLAN FILE |
| LOG FORMAT DEFINITION | FILE NAME | THE CONTROL MANAGER DRAWS OUT TIME FROM THE ENTITY LOG SENT FROM THE MONITOR AGENT |
| AGENT AUTHORIZA-TION LIST | FILE NAME | THE LIST OF AN AGENT AUTHORIZED BY AN AUTHORIZATION ORGANIZATION. THE CONTROL MANAGER DOES NOT ACCEPT PROCESS FROM AN AGENT WHICH IS NOT IN THE LIST |
| STATE MONITOR | TIME INTERVAL | THE INTERVAL FOR CONFIRMING THE STATE OF AN AGENT IS SPECIFIED |
| MONITOR AGENT | ID (PLURAL IDS ALLOWED) | WHEN THE MONITOR AGENT IS OBJECT-DEFINED, IT IS AUTOMATICALLY ADDED |
| ACTION AGENT | ID (PLURAL IDS ALLOWED) | WHEN THE ACTION AGENT IS OBJECT-DEFINED, IT IS AUTOMATICALLY ADDED |

FIG.32

| ATTRIBUTE | | EXPLANATION |
|---|---|---|
| AGENT | ID | THE CONTROL MANAGE ASSIGNS AT THE TIME OF OBJECT DEFINITION |
| | STATUS | SHOW THE OPERATION STATE |
| | IP ADDRESS | INFORMATION TO BECOME NECESSARY IN COMMUNICATION FROM THE CONTROL MANAGER TO AN AGENT |
| | PORT NUMBER | |
| | COMMUNICATION TIMEOUT VALUE | |
| | THE NUMBER OF COMMUNICATION RETRIES | |
| ENTITY | ID | OBJECT ENTITY OF AN AGENT |
| CONTROL MANAGER | ID | CONTROL MANAGER OF AN AGENT |

FIG.33

| ATTRIBUTE | | EXPLANATION |
|---|---|---|
| ENTITY | ID | THE CONTROL MANAGE ASSIGNS AT THE TIME OF OBJECT DEFINITION |
| | IP ADDRESS | INFORMATION TO BECOME NECESSARY IN COMMUNICATION FROM AN AGENT TO AN ENTITY |
| | PORT NUMBER | |
| | COMMUNICATION TIME OUT VALUE | |
| | THE NUMBER OF COMMUNICATION RETRIES | |
| FW ENTITY | ID | ENTITY CORRESPONDING TO THE FIREWALL OF THE ENTITY |
| MONITOR AGENT | ID | WHEN THE MONITOR AGENT IS OBJECT-DEFINED, IT IS AUTOMATICALLY ADDED |
| ACTION AGENT | ID | WHEN THE ACTION AGENT IS OBJECT-DEFINED, IT IS AUTOMATICALLY ADDED |
| COUNTER-MEASURE HISTORY | (PLURALITY IS ALLOWED) | LEAVE A COUNTERMEASURE OR A COUNTERMEASURE RESULT AS A HISTORY |
| ENTITY INHERENT INFORMATION | FIREWALL-1 | FIREWALL-1 OBJECT NAME |

US 7,412,721 B2

METHOD OF AND SYSTEM FOR MANAGING INFORMATION, AND COMPUTER PRODUCT

FIELD OF THE INVENTION

The present invention relates to a technology for detecting omen of an attack on a website and implementing a countermeasure before actual attack is started thereby minimizing the damage.

BACKGROUND OF THE INVENTION

According to development of recent network technologies, although the utilization of WWW (World Wide Web) that is a distribution system on the Internet has been rapidly expanded and various HTTP servers providing information have been progressively increased, illegal accesses have also increased in accordance with the increase of the number of servers.

This type of illegal access may include detecting a security hole on a network to invade and attack a system via the security hole. In this case, the security hole is detected through a procedure in which (1) an operating host is detected, (2) services offered are detected, (3) network configuration is detected, (4) OS is identified, (5) application software are identified, and (6) the security hole is detected. Thereafter, an illegal access is made by generating a system error, for example, by sending a large number of packets to the target system by utilizing many stepping-stone sites.

It is impossible to differentiate such an illegal access from the ordinary access. Therefore, it is usually difficult for a system manager to detect an illegal access until invasion and attack have been made.

Conventionally, when it is recognized that large number of packets are being received, it is considered that an illegal access is about to be made. In this case, a countermeasure is adopted for minimizing actual damage due to the illegal access as fast as possible.

However, once attack is started, it is extremely difficult to defend this attack. Even if appropriate countermeasures are taken, the website has to be disadvantageously closed temporarily. Particularly, in a website continuously providing services for a large number of users such as banks and transport facilities, the influence due to closing of the website affects various areas, and there is a possibility that enormous actual damage is brought.

Thus, how to minimize the damage by such illegal access has become a significant problem, and desirably, a configuration in which no damage occurs even when an illegal access is performed is needed.

SUMMARY OF THE INVENTION

It is an object of the present invention to provide a method of and system for managing information for detecting omen of an attack on a website and implementing a countermeasure before actual attack is started thereby minimizing the damage. It is another object of this invention to provide a computer readable recording medium that stores a computer program which when executed realizes the method according to the present invention.

According to the present invention, a notification content and a countermeasure are held in correlated manner to each other in a database. A communication request monitor unit monitors communication requests and detects abnormality. When abnormality is detected, the communication request monitor unit notifies the abnormality to a selection unit. The selection unit selects a countermeasure, corresponding the notice from the communication request monitor unit, from the database. A performing unit performs the countermeasure against the attack based on selected countermeasure.

The computer readable recording medium stores a computer program which when executed on a computer realizes the method according to the present invention on a computer.

Other objects and features of this invention will become apparent from the following description with reference to the accompanying drawings.

BRIEF DESCRIPTION OF THE DRAWINGS

FIG. 21A explains exchange of the detection notification and the ACK between the control manager and the monitor agent, FIG. 21B shows an example of the data structure of the detection notification, and FIG. 21C shows an example of the data structure of the ACK.

FIG. 28A to FIG. 28D shows examples of the countermeasure plans.

FIG. 31 is a table showing the control manager object.

FIG. 32 is a table showing the agent object.

FIG. 33 is a table showing the entity object.

FIG. 37 is an explanatory chart for explaining the diversified defense measure selection employing the mounting information and the like.

DESCRIPTION OF THE PREFERRED EMBODIMENTS

Embodiments of the method of and system for managing information, and a computer product according to the present invention will be explained in detail below while referring to accompanying drawings.

Figure 1:
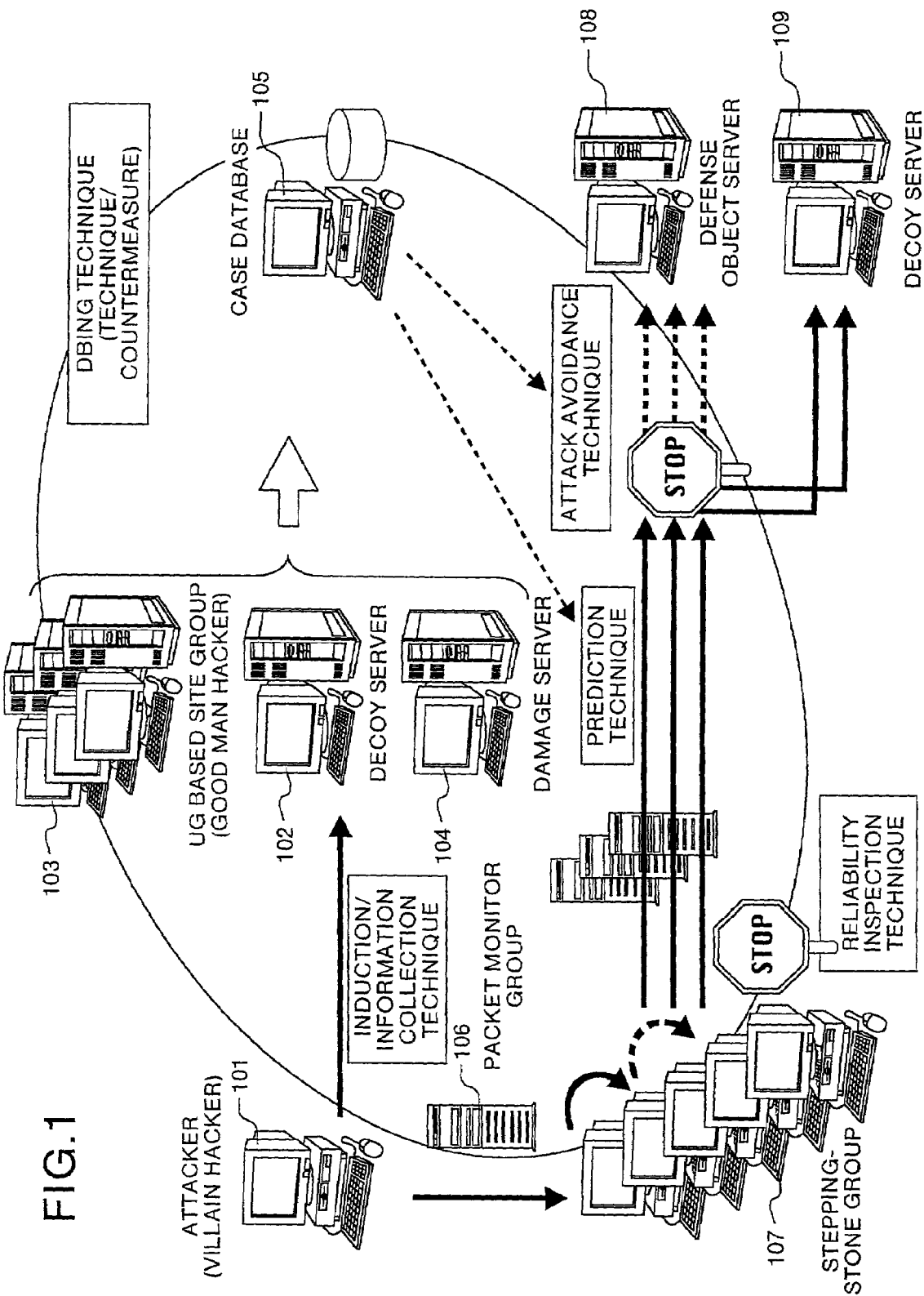
FIG. 1 is an explanatory view for explaining various techniques adopted in an entire system according to one embodiment of the present invention.

First, various techniques adopted in the entire system according to the present embodiment are explained. FIG. 1 is an explanatory view for explaining the various techniques adopted in the entire system according to the present embodiment. As shown in the drawing, this system makes full use of an induction/information collection technique, techniques for creating a database ("databasing technique"), a prediction technique, a reliability avoidance technique, an attack avoidance technique, and the like.

Specifically, in the induction/information collection technique, vulnerability is manifested so as to induce an attacker (villain hacker) 101 to do attack in a decoy server 102, and underground information and damage website information are collected as well as information related to an attack which is collected through the attack caused by the induction so that obtained information is analyzed to recognize it as an attack pattern.

In the databasing technique, the analyzed attack pattern, damage anticipation, and countermeasure proposal are databased, and an access technique and its counter measure for, for example, a UG based website group (good man hacker) 103 shown in the drawing, a decoy server 102, and a damage server 104, are stored up in a case database 105.

In the prediction technique, the omen of an attack is detected from a currently occurring condition, employing case database 105, so as to predict an attack which may occur, and, specifically, the current condition due to the attacker 101 is detected by a packet monitor group 106.

In the attack avoidance technique, a currently optimum avoidance countermeasure is selected from information such as progress of an attack and an environment, employing the case database 105, and, specifically, an attack is avoided, for example, by inducing a decoy server 109 to attack a defense object server 108 taking a stepping-stone group 107 in the drawing as stepping-stones. In the reliability detection technique, performed is an inspection, for example, as to whether or not a website which is assumed to be an attack source has been a stepping-stone, or the like.

Next, the prediction technique shown in FIG. 1 is explained further in detail. In this prediction technique, in an actual attack or an attack caused by an induction, the omen causing an attack is databased not only in a form of a single-engine but also in a form in which a plurality of various events spatially/temporally cooperate with each other through parsing of a pattern obtained through the attack so that the area of influence, degree of influence, and damage level of an attack with respect to the omen are maintained in a form in which they are related to each other to semi-automatically update them.

Plural various events are recognized not only in a form of single-engine but also in a form in which they are related to each other and are compared with the case database 105 so as to detect them as an omen or a prospective omen. Then, the detected omen and prospective omen are not only interpreted by themselves but also are notified for another website such as a downstream site.

Further, an attack which can occur in the future is predicted from the omen and prospective omen notified from a website detecting itself or for example from an upstream website by checking the case database 105. This prediction of an attack is performed with respect to the area of influence, the degree of influence, the damage level, and the like in accordance with the information of the case database 105.

Thus, the prediction technique is composed of (1) databasing of an illegal access technique and its omen phenomenon, (2) omen detection, (3) omen/prospective omen notification, (4) attack omen, and the like.

(1) Databasing of the Illegal Access Technique and Its Omen Phenomenon:

The illegal access technique disclosed in the underground (UG) based website group 103 is collected and analyzed, an attack technique actually occurring in the damage server 104 (another site) is collected and analyzed, vulnerability is manifested by the decoy server 102 to induce an attack, and the attack technique is collected and analyzed.

Then, based upon parse results, an attack pattern is parsed not only in a form of a single-engine but also in a form in which plural various events spatially/temporally cooperating with each other so that the omen causing an attack is databased. The area of influence, the degree of influence, and the damage level of an attack for an omen are maintained in a form in which they cooperate with each other so as to semi-automatically update the case database 105.

(2) Omen Detection:

A packet arrival state which is different from a steady state directed to a specific website is detected, a packet arrival state which is different from a steady state at a specific website is detected, not only a single-engine but also plural various events are recognized in a form in which they cooperate with each other based upon the detected results, and an omen or a prospective omen is detected based upon the recognized results, comparing with the content of the case database 105.

(3) Omen/Prospective Omen Notification:

The omen and prospective omen detected are notified to another website such as for example a downstream site. For example, when a packet outgoing which is different from a steady state directed to a specific website is requested, the packet is transmitted, and information of "it is possible that this packet is the omen of some (XX) attack" is notified to the site.

(4) Attack Omen:

A detection is performed by itself and the omen and prospective omen notified from another website such as an upstream website are compared with the content of the case database 105 so that an attack which can occur in the future is predicted.

Next, the attack avoidance technique shown in FIG. 1 is explained further in detail. In this attack avoidance technique, an avoidance means in each of progress processes of an attack is considered for each kind of an attack object and for each environmental condition from a history in which the attack is received, and the avoidance means is databased in a form in which the avoidance means is related to an omen/attack to update it semi-automatically.

Then, after an attack is predicted, in which stage the present point exists in the predicted attack is predicted, and an attack object and an environmental condition are found out so that an optimum avoidance means is decided from the case database 105. Thereafter, an attack is prevented from happening employing the decided avoidance means. Thus, the attack avoidance technique is composed of (1) databasing of the avoidance means, (2) selection of the avoidance means, (3) use of the avoidance means, and the like.

(1) Databasing of the Avoidance Means:

Through a history in which the attack is received, an avoidance means in each of progress processes of the attack is considered, developed, and verified for each kind of an attack object and for each environmental condition, and the avoidance means is databased in a form in which the avoidance means is related to the omen/attack to update semi-automatically.

(2) Selection of the Avoidance Means:

After the attack is predicted, in which stage the present point exists in the predicted attack is predicted. Then, an object of the attack predicted is ascertained to find out an environmental condition. The progress condition of the attack, the attack object, and the environmental condition are compared with the case database 105 to decide an optimum avoidance means.

(3) Use of the Avoidance Means:

An omen/a prospective omen being a factor to predict the attack is notified to the notified upstream website to urge the packet outgoing source being the source of the omen/prospective omen to do a reliability inspection. In order to prevent expansion of the damage of the attack, a packet to be destroyed is selected and is destroyed. Further, in order to prevent the expansion of the damage of the attack, a packet to be destroyed is selected, and an upstream website in which there is a possibility that the packet is transmitted is urged not to transmit. That the attack has been received is notified to another website so that a similar attack is not performed in another site. The decoy server 109 imitating a website detecting an attack is provided so that following attacks are led to the decoy server 109 side.

The decoy servers 102 and 109 are as follows. The decoy servers 102 and 109 are servers inducing an attack while pretending to have vulnerability and pretend to have vulnerability through (1) a user name change (manager authority), (2) a change in a login-message (OS or the number of editions), (3) a change in an application name and the number of editions, (4) a false name of an operation network, (5) falsifying the existence of a vulnerable CGI program, and the like.

(1) User Name Change (Manager Authority):

For example, in the Windows, although a user having a manager authority is "Administrator" at the time of initial setting time, user "Kanrisya" is newly set to have a manager authority, and the manager authority is removed from conventional user "Administrator" so as to pretend that the system is vulnerable.

(2) Change in a Login Message (OS or the Number of Editions):

A login message in a conventional Solaris machine is as follows.
SunOS 5.6
login: user-name
Password: ********
last login: Tue Aug. 29 08: 52: 55 on console
Sun Microsystems Inc. SunOS 5.6 Generic August 1997
%

Here, the login message is altered to represent as follows so as to let others see as if an OS different from the actual one (wherein past vulnerability remains due to an old system) operates so that it can be pretended that the system is vulnerable.

TurboLinax release 3.2 (***)
Kernel 1.2.9 on an i386 (host.domain.company.co.jp)
login: user-name
Password:********
%

(3) Change in an Application Name and the Number of Editions:
When a HEAD message is sent to a web server, a server application name is sent back as follows.
HTTP/1.1 200 OK
Data: Sat, Jan. 1, 2000 10:25:12 GMT
Server: Apache/1.3.9 (Unix)
Here, a reply message is altered as follows, and it is pretended that another application different from an actual one (wherein past vulnerability remains due to an old system) operates so as to let others deem that the system is vulnerable.
HTTP/1.0 200 OK
Server: Microsoft-IIS/3.0
Date: Sat, Jan. 1, 2000 10:25:25 GMT (4) False Name of an Operation Network:
By employing an abuse tool such as a port scan, a network service during operation can be examined.

| Port | State | Protocol | Service |
|------|-------|----------|---------|
| 21   | open  | tcp      | ftp     |
| 80   | open  | tcp      | www-http |
| 443  | open  | tcp      | https   |

Here, false "network service reception system" is prepared, and accesses to the false service (vulnerable service, port 23, 79, 110, 111, 143) are all monitored. As a result thereof, by the abuse tool such as the port scan, a (false) examination result as follows can be obtained, whereby a misconception that a vulnerable service operates can be induced.

| Port | State | Protocol | Service |
|------|-------|----------|---------|
| 21   | open  | tcp      | ftp     |
| 23   | open  | tcp      | telnet  |
| 79   | open  | tcp      | finger  |
| 80   | open  | tcp      | www-http |
| 110  | open  | tcp      | pop3    |
| 111  | open  | tcp      | sunrpc  |
| 143  | open  | tcp      | imap    |
| 443  | open  | tcp      | https   |

(5) Falsifying the Existence of a Vulnerable CGI Program:
By employing an abuse tool such as a scan tool, the existence of a providable CGI program can be examined.
Searching for _vti_inf.html :[Not Found]
Searching for service.pwd :[Not Found]
Searching for users.pwd :[Not Found]
Searching for authors.pwd :[Not Found]
Searching for administrators :[Not Found]
Searching for shtml.dll :[Not Found]
Searching for shtml.exe :[Not Found] . . .
Searching for [perl.exe]. :[Not Found]
Searching for [wwwboared.pl]:[Not Found]
Searching for [www-sql]. :[Not Found]
An already known CGI program (or a file having the same name as the CGI program) in which the existence of vulnerability is known is prepared.

% touch cgi-bin/phf cgi-bin/Count cgi-bin/test-cgi cgi-bin/phf.cgi
% touch cgi-bin/webgais cgi-bin/perl.exe cgi-bin/www-sql
% touch _vti_inf.html
% mkdir _vti_bin _inf.html _vti_pvt cfdocs
% touch _vti_bin/shtml.exe _vti_pvt/service.pwd _vti_pvt/authors.pwd
% touch cfdocs/zero.cfm cfdos/root.cfm As a result, by the abuse tool such as the scan tool, (false) examination results as follows are obtained, and it is possible to make others perceive as if a vulnerable CGI program exists.
Searching for _vti_inf.html :[Found!]
Searching for service.pwd :[Found!]
Searching for users.pwd :[Not Found]
Searching for authors.pwd :[Found!]
Searching for administrators :[Not Found]
Searching for shtml.dll :[Not Found]
Searching for shtml.exe :[Found!] . . .
Searching for [perl.exe]. :[Found!]
Searching for [wwwboared.pl]:[Not Found]
Searching for [www-sql]. :[Found!]

Figure 2:
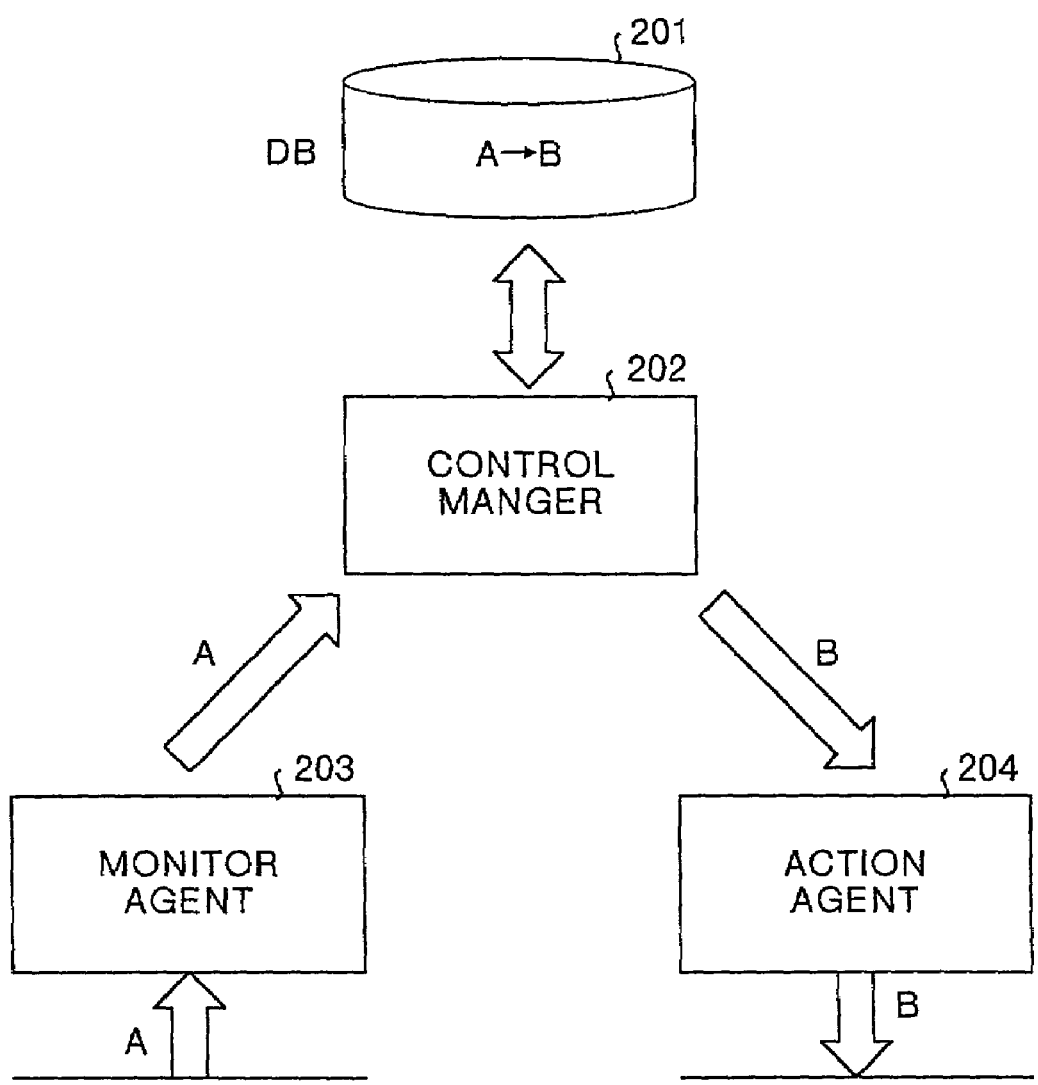
FIG. 2 is a block diagram showing a fundamental configuration of an information management system according to the embodiment.

Next, a fundamental configuration and the like of an information management system according to the present embodiment is explained employing FIG. 2 to FIG. 13. FIG. 2 is a block diagram showing a fundamental configuration of the information management system according to the present embodiment. As shown in the drawing, this information management system is comprised of a control manager 202 having a database (DB) 201, a monitor agent 203, and an action agent 204.

In the database 201, data A and a countermeasure B are stored up corresponding to each other, and when the control manager 202 accepts a notice of the data A from the monitor agent 203, the control manager 202 refers to the content of the database 201 to specify the countermeasure B and a request party (action agent 204) of the countermeasure to instruct this action agent 204 to implement the countermeasure B. Information related to the type, content, order, and time interval of two or more communications in the progress process of an attack event or a leakage event is collected, and the collected and sorted information is reflected on the database 201.

Specifically, when the monitor agent 203 analyzes a log of a fire wall or a WWW server (hereafter, referred to as "entity") and detects abnormality, the monitor agent 203 notifies the control manager 202 of the data A representing that abnormality has occurred. Then, the control manager 202 refers to the database 201 to specify the countermeasure B. Specifically, this database 201 holds the data notified from the monitor agent 203 in time series and the control manager selects the countermeasure B based upon such time series data.

Figure 3:
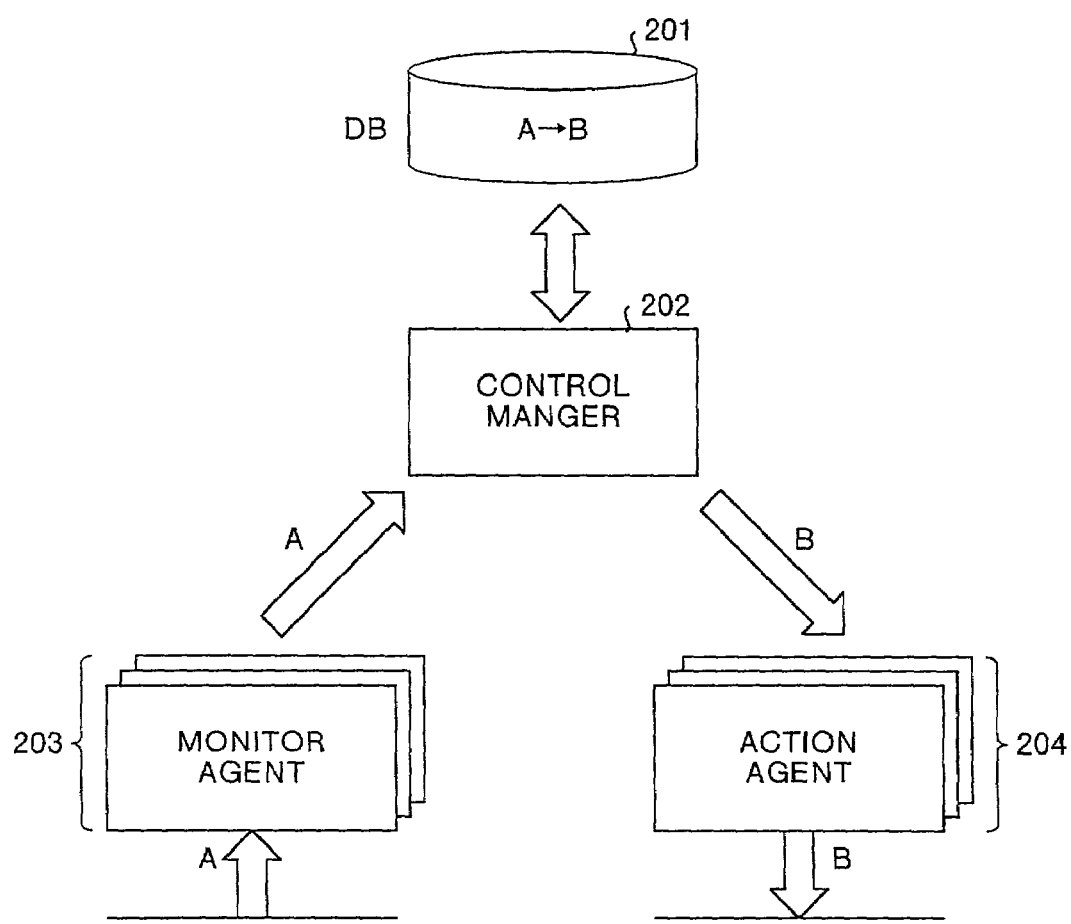
FIG. 3 is a block diagram showing a configuration of the case wherein a plurality of monitor agents and a plurality of action agents are provided.

For example, as this countermeasure B, there is a countermeasure that "when abnormality occurs in a WWW server, the communication directed to a firewall or a WWW server is not made pass" or the like. A plurality of monitor agents 203 and a plurality of action agents 204 can exist as shown in FIG. 3.

Figure 4:
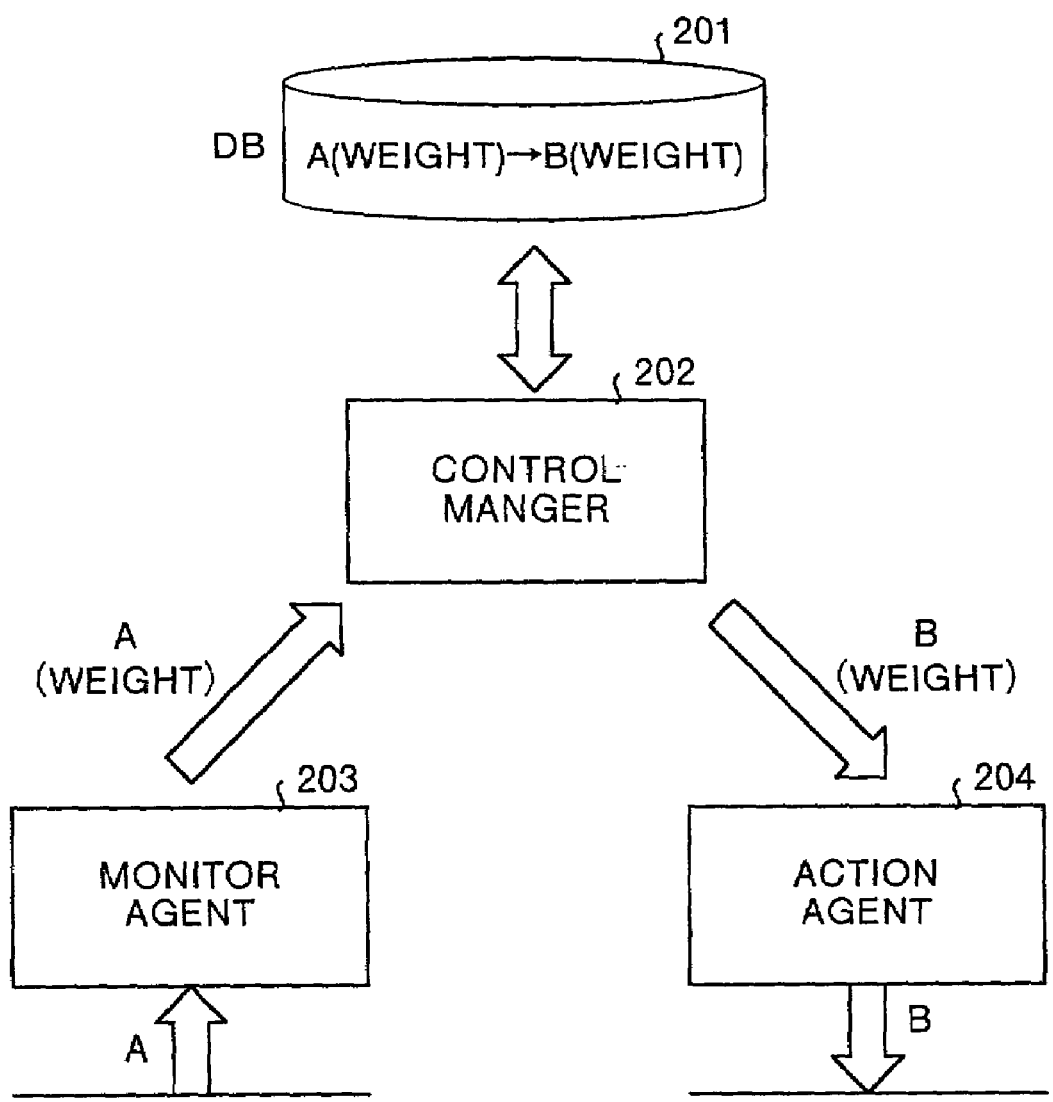
FIG. 4 is a block diagram showing the case wherein the control manager holds weighted data A and weighted countermeasure B which correspond to each other.

Although the monitor agent 203, when acquiring the data A, notifies the control manager 202 of the data A themselves, the control manager 202 can maintain the weighted data A and the weighted countermeasure B while making them correspond to each other as shown in FIG. 4.

Figure 5:
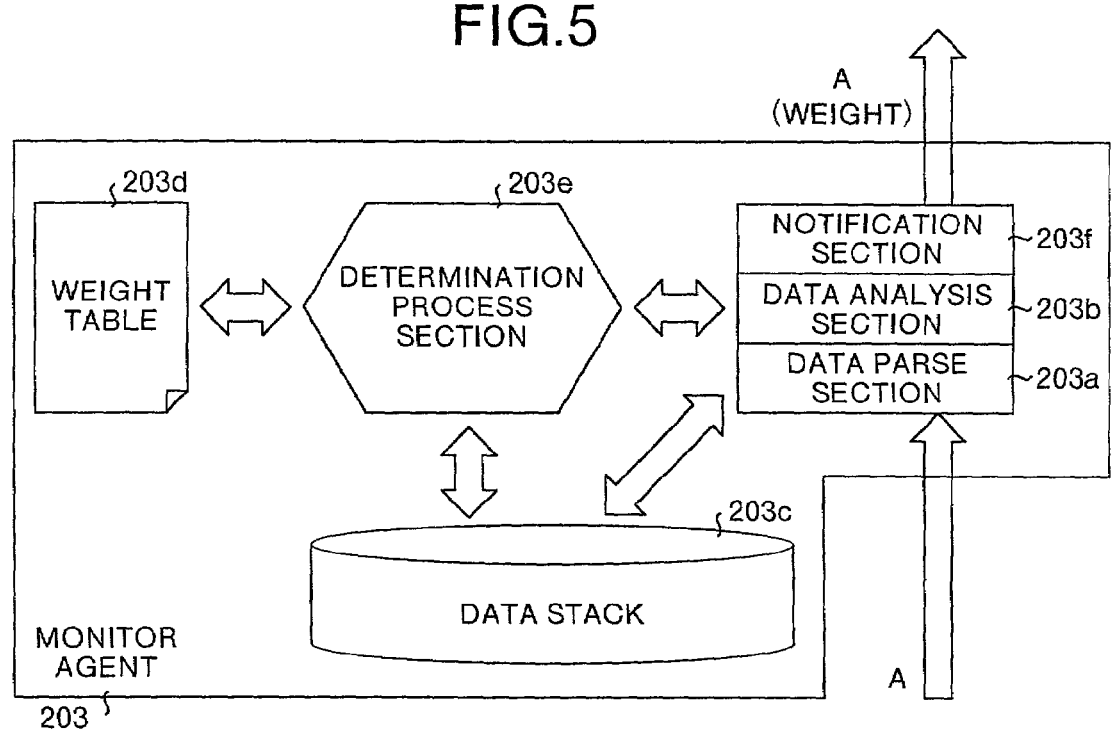
FIG. 5 is a block diagram showing the configuration of the monitor agent shown in FIG. 4.

FIG. 5 is a block diagram showing the configuration of the monitor agent 203 in such case. As shown in the drawing, the monitor agent 203 is comprised of a data parse section 203a, a data analysis section 203b, a data stack 203c, a weight table 203d, a determination process section 203e, and a notification section 203f.

That is, this monitor agent 203 data-parses the data A by the data parse section 203a and analyzes the data by the data analysis section 203b to store them up in the data stack 203c. The data stored up in this data stack 203c are maintained for the respective time series. Then, based upon the weight table 203d prepared in advance, the determination process section 203e determines a weight, and the notification section 203f notifies the control manager 202 of the weighted event A. A user can arbitrarily set a weight coefficient employed for such weighting and can set it based upon mounting information, operation management information, and/or security information.

Figure 6:
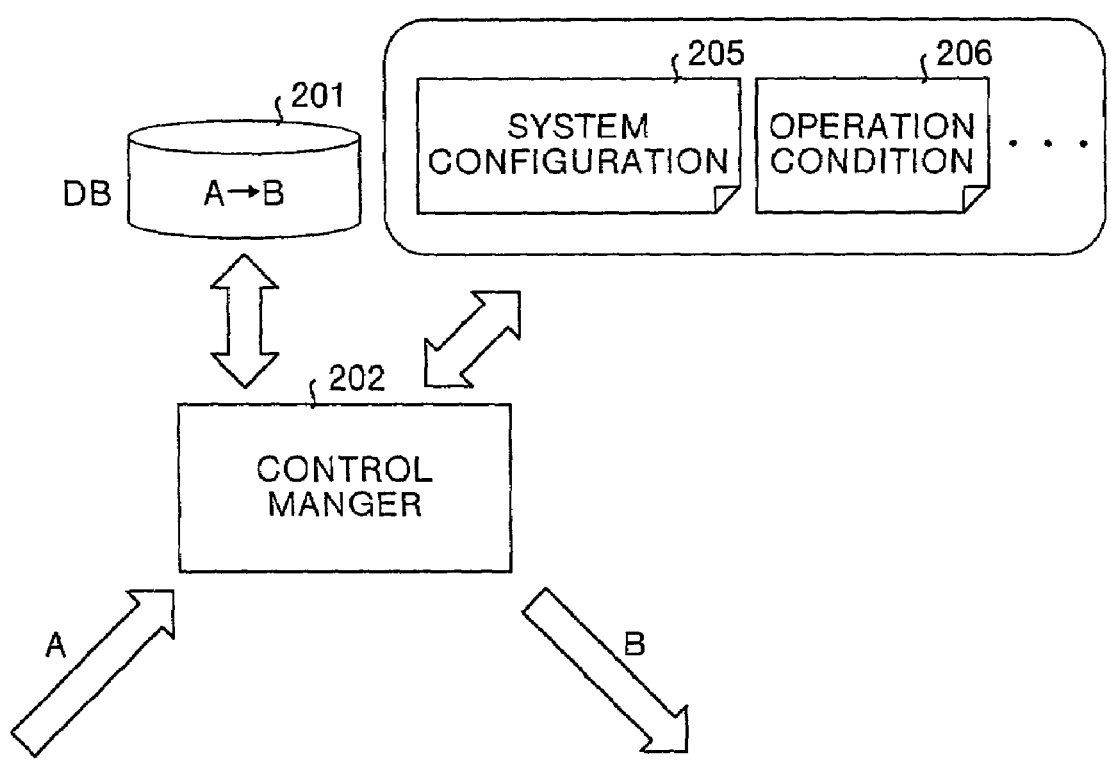
FIG. 6 is an explanatory diagram for explaining the control manager shown in FIG. 2.

Next, the control manager 202 shown in FIG. 2 is explained. FIG. 6 is an explanatory diagram for explaining the control manager 202 shown in FIG. 2. As shown in the drawing, this control manager 202, as already explained, when accepting the data A from the monitor agent 203, specifies the countermeasure B, referring to the database 201 and, at this time, also considers a system configuration 205 and an operation condition 206 and the like.

Figure 7:
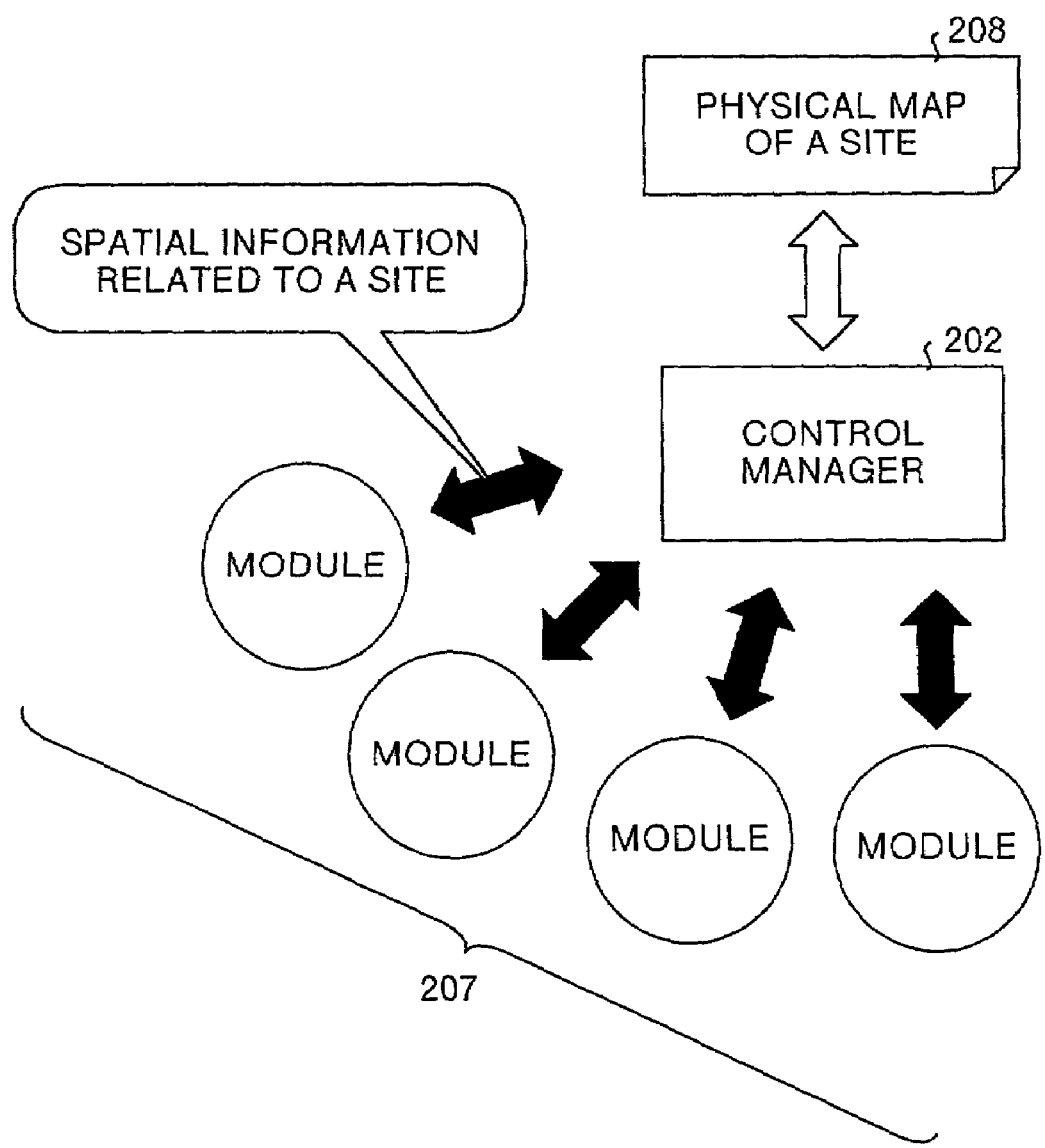
FIG. 7 is an explanatory diagram for explaining the formation of a physical map by the control manager shown in FIG. 2.

This control manager 202 acquires spatial information related to a website from each module 207 and forms a physical map of the website (site map) 208 based upon the acquired spatial information as shown in FIG. 7. Various kinds of monitor agents 203 and action agents 204 are included in the modules 207 here.

Figure 8:
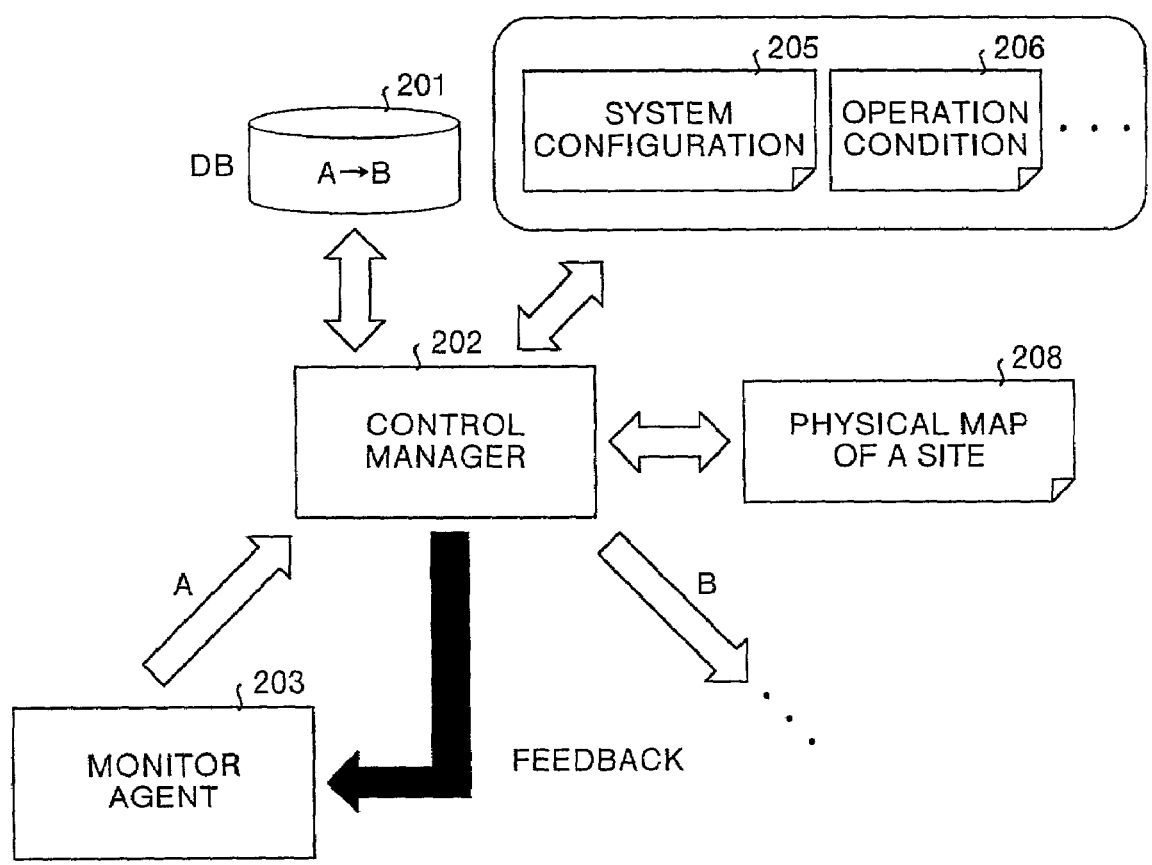
FIG. 8 is an explanatory diagram for explaining the feedback from the control manager to the monitor agent shown in FIG. 2.

As shown in FIG. 8, the control manager 202 performs feedback toward the monitor agent 203, and, specifically, the control manager 202 distributes an analysis rule employed in the data analysis section 203b of the monitor agent 203 to the monitor agent 203. The analysis rule of the monitor agent 203 is updated under the control of the control manager 202. Thus, based upon the site map 208, the kind and/or time of communication to be a monitor object are distributed to each monitor agent 203.

Figure 9:
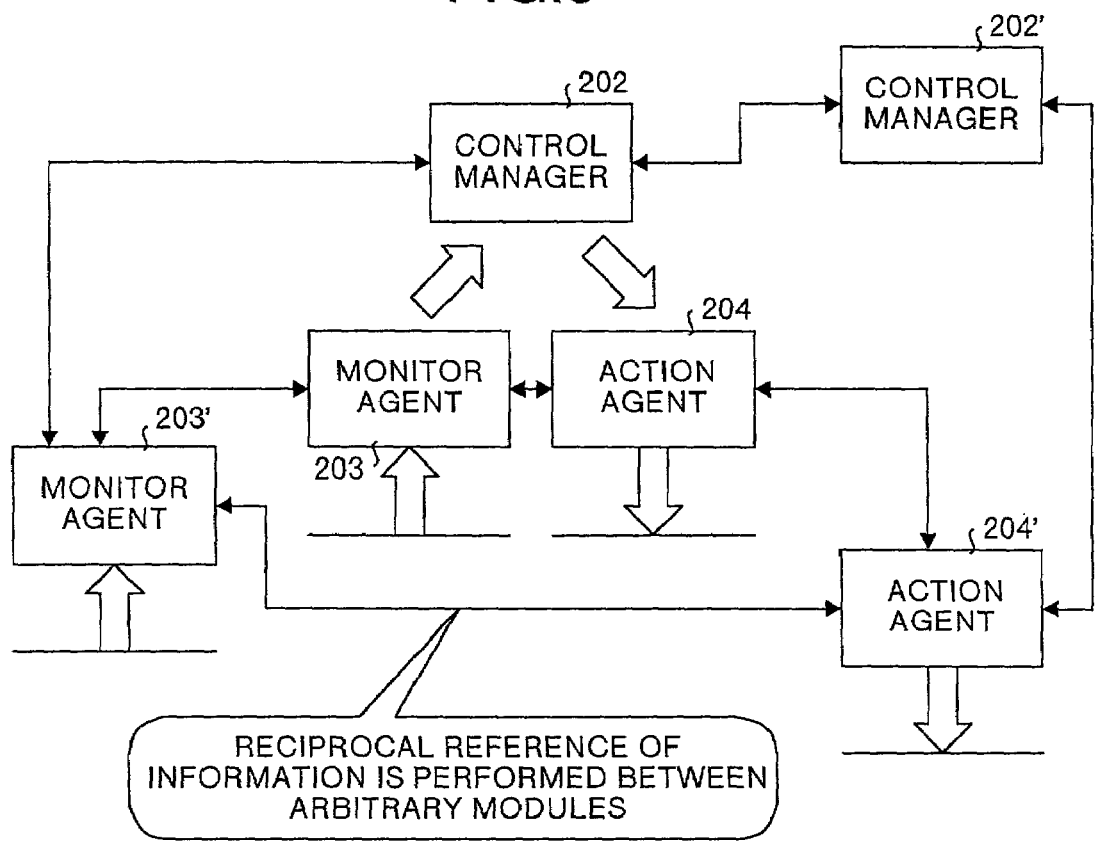
FIG. 9 is an explanatory diagram for explaining the reciprocal information reference between modules.

Next, reciprocal information reference between modules is explained. FIG. 9 is an explanatory diagram for explaining the reciprocal information reference between modules. For the sake of convenience of explanation, here, shown is the case in which the two respective control managers, monitor agents, and action agents are provided.

As already explained, although the countermeasure B is instructed from the control manager 202 to the action agent 204 when the data A are transmitted from the monitor agent 203 to the control manager 202, reciprocal references of information between the monitor agent 203 to the monitor agent 203,' the action agent 204 to the action agent 204,' the control manager 202 to the control manager 202' are also performed.

Figure 10:
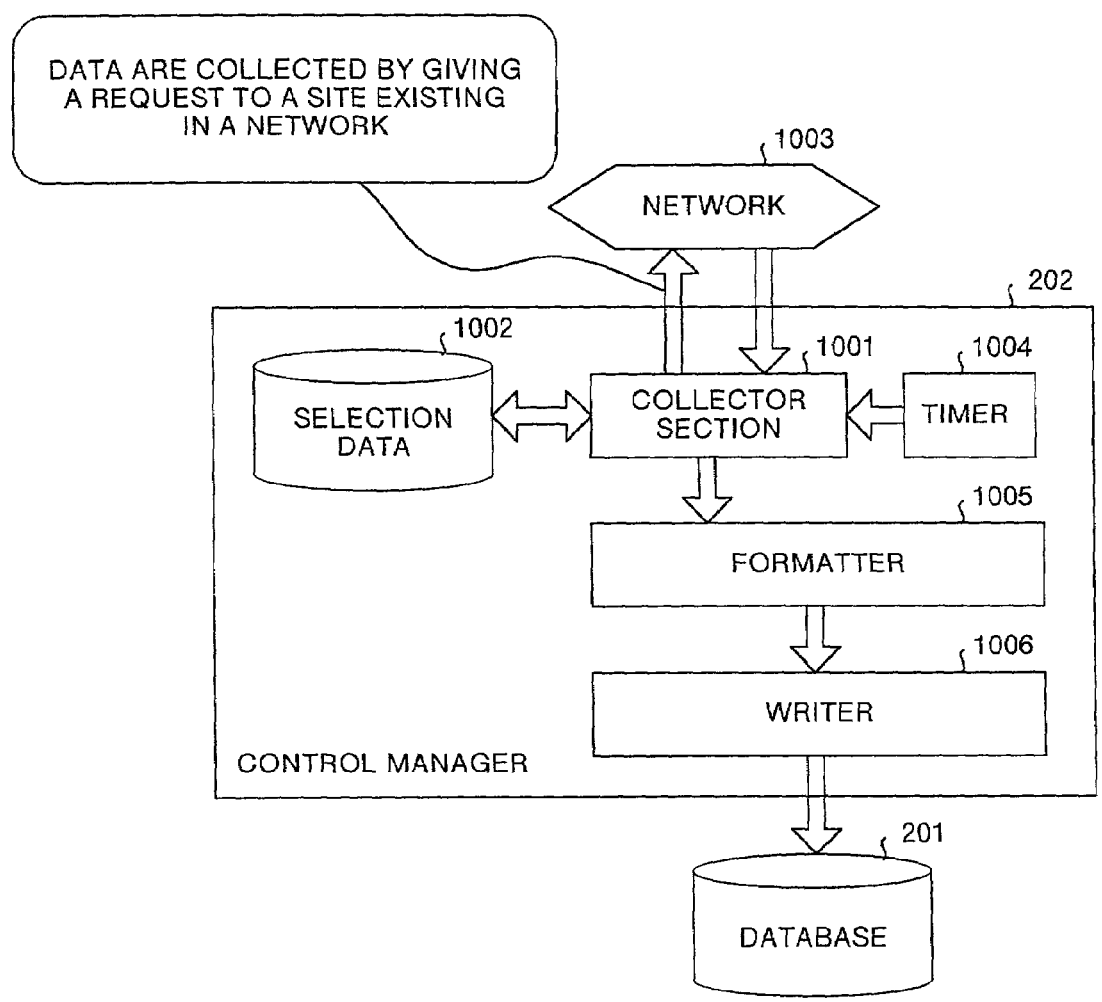
FIG. 10 is an explanatory diagram for explaining the automatic update (PULL type) of the database shown in FIG. 2.

Next, an automatic update of the database 201 shown in FIG. 2 is explained. FIG. 10 is an explanatory diagram for explaining the automatic update (PULL type) of the database 201 shown in FIG. 2. As shown in the drawing, in the management database 202 updating the database 201, a collector section 1001 sends a request to a website existing in a network 1003 based upon selection data 1002 to collect data. Specifically, at the time of timeout of a timer 1004, the collector section 1001 reads the selection data 1002 and requests data corresponding to the selection data 1002.

Then, this collector section 1001 outputs the data acquired from each website to a formatter 1005 to perform a format conversion and the like, and a writer 1006 writes the result thereof in the database 201.

Figure 11:
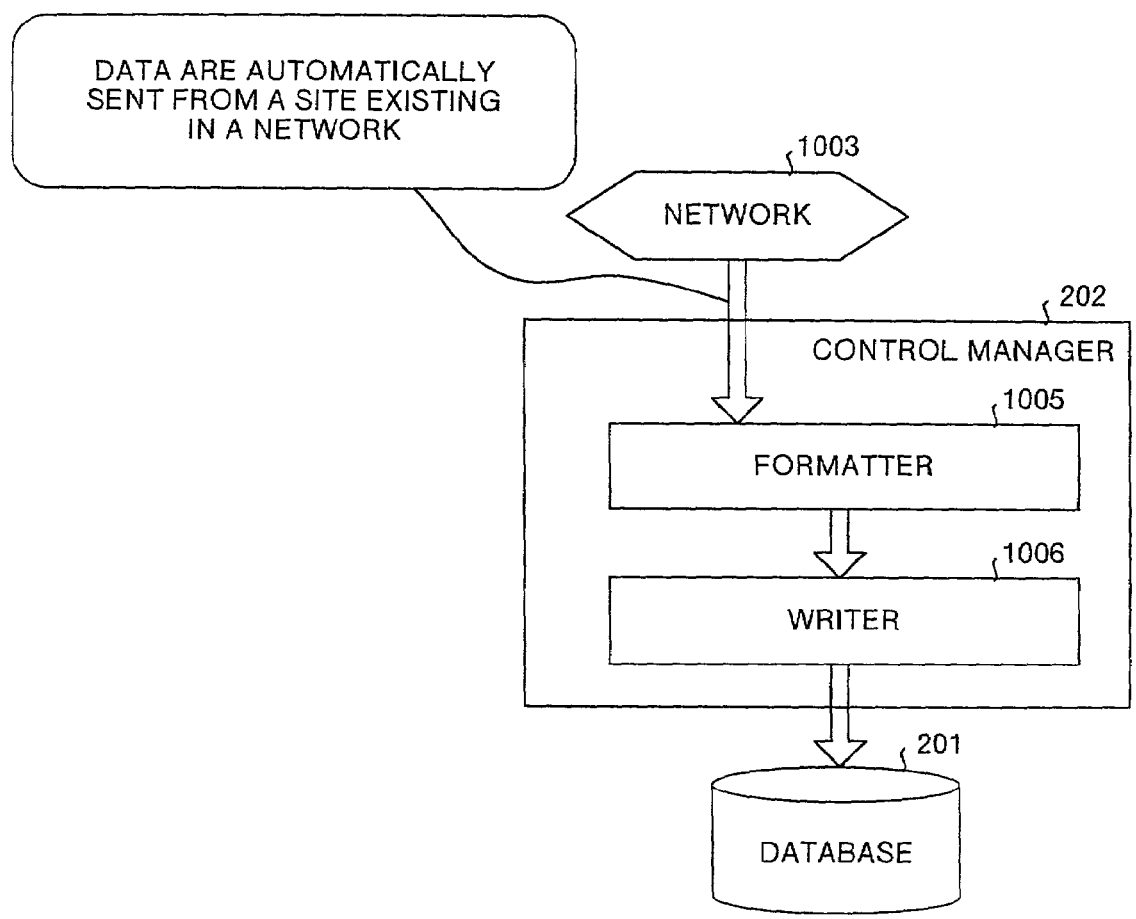
FIG. 11 is an explanatory diagram for explaining the automatic update (PUSH type) of the database shown in FIG. 2.

It is not necessary that the automatic update of the database 201 is performed in the PULL type, and it can be performed in a PUSH type as shown in FIG. 11. When the database 201 is automatically updated in the PUSH type, it is possible to automatically send data from a website existing in the network to the database 201, and the configuration of the control manager 202 can be simplified.

Figure 12:
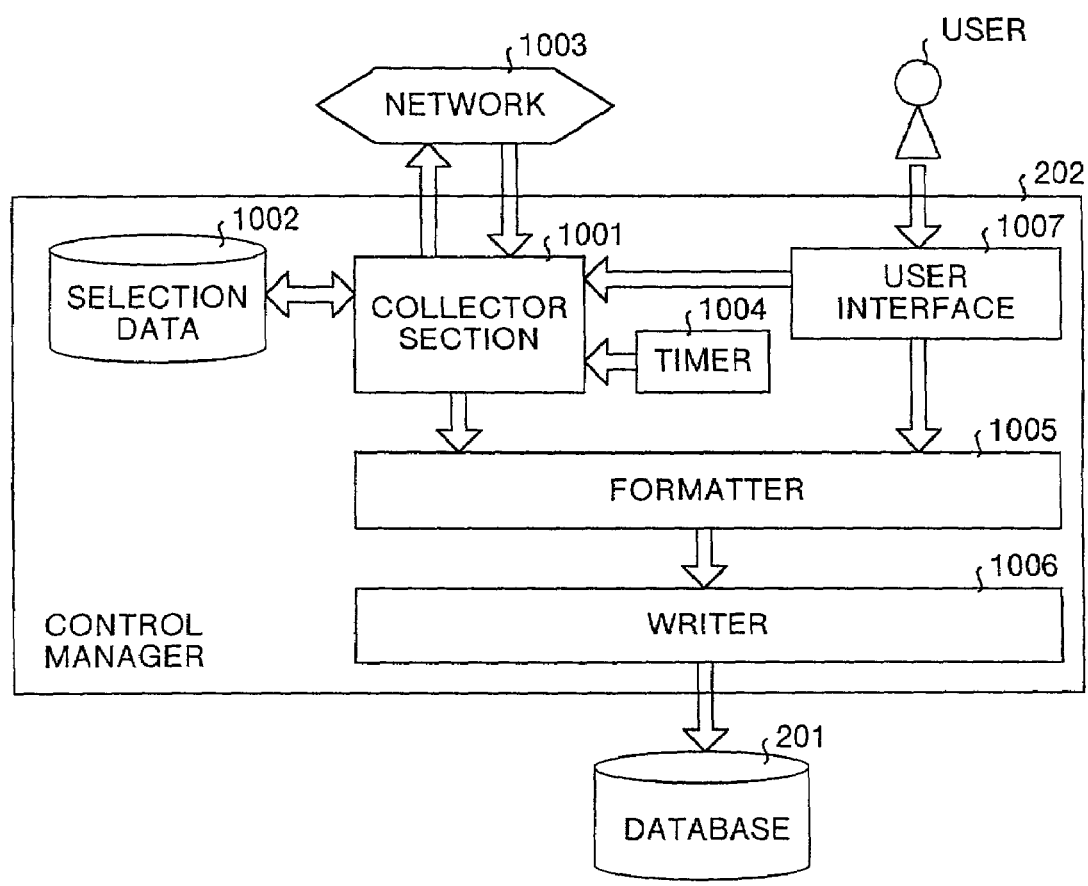
FIG. 12 is an explanatory diagram for explaining the automatic update (PULL type) of the database, including a case via human hands.
Figure 13:
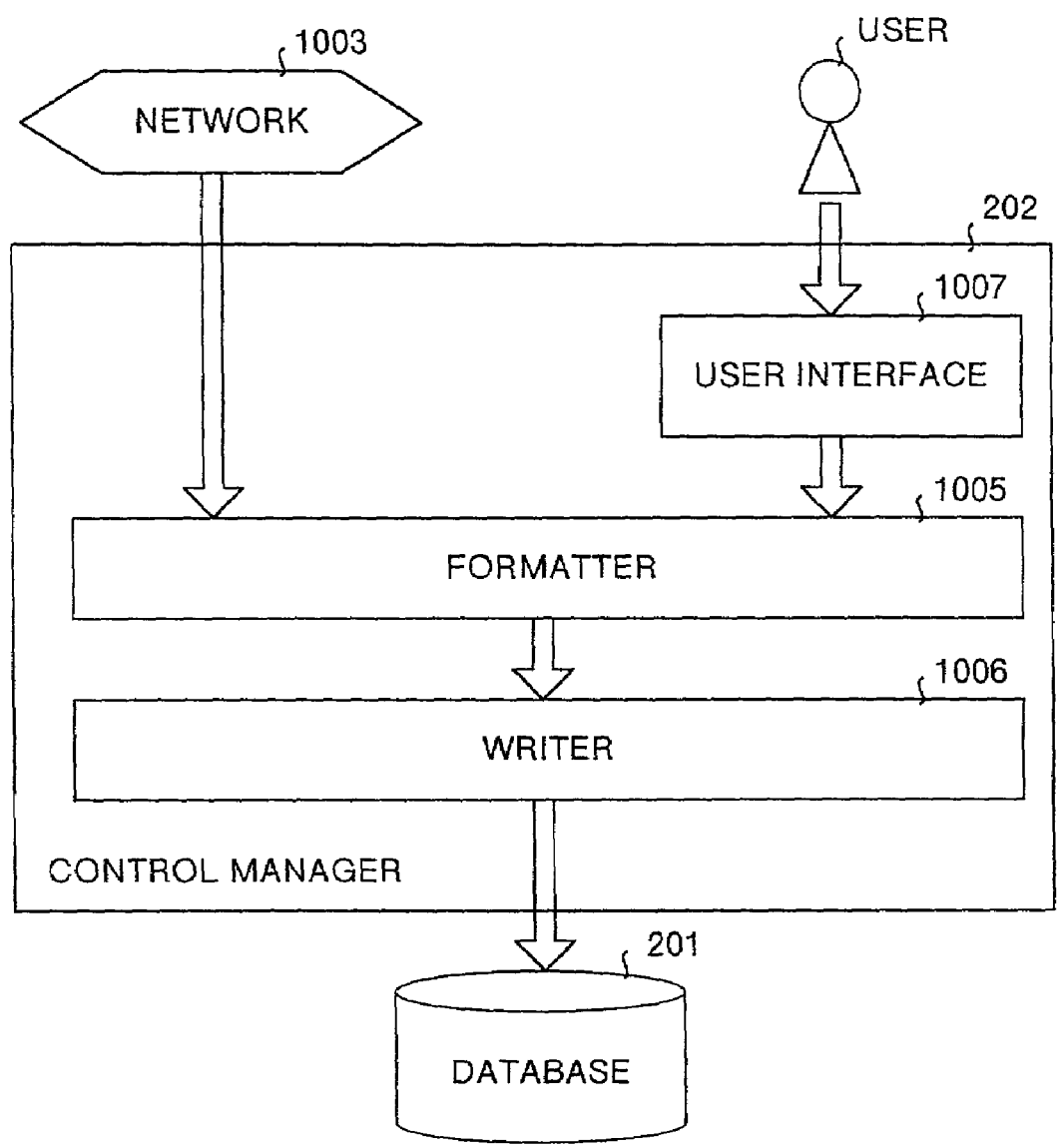
FIG. 13 is an explanatory diagram for explaining the automatic update (PUSH type) of the database including a case via human hands.

As shown in FIG. 12, when a user interface 1007 is provided in the control manager 202 of a PUSH type system, a request can be sent to a desired website at a user's suggestion. When the user interface 1007 is provided in the control manager 202 of the PULL type system as shown in FIG. 13, data automatically sent from a website existing in the network can be taken in the database 201 at a user's suggestion.

Next, a procedure by the control manager 202, the monitor agent 203, and the action agent 204 shown in FIG. 2 is explained. First, a procedure from the time the monitor agent 203 detects abnormality to the time the action agent 204 performs a countermeasure is explained.

Figure 14:
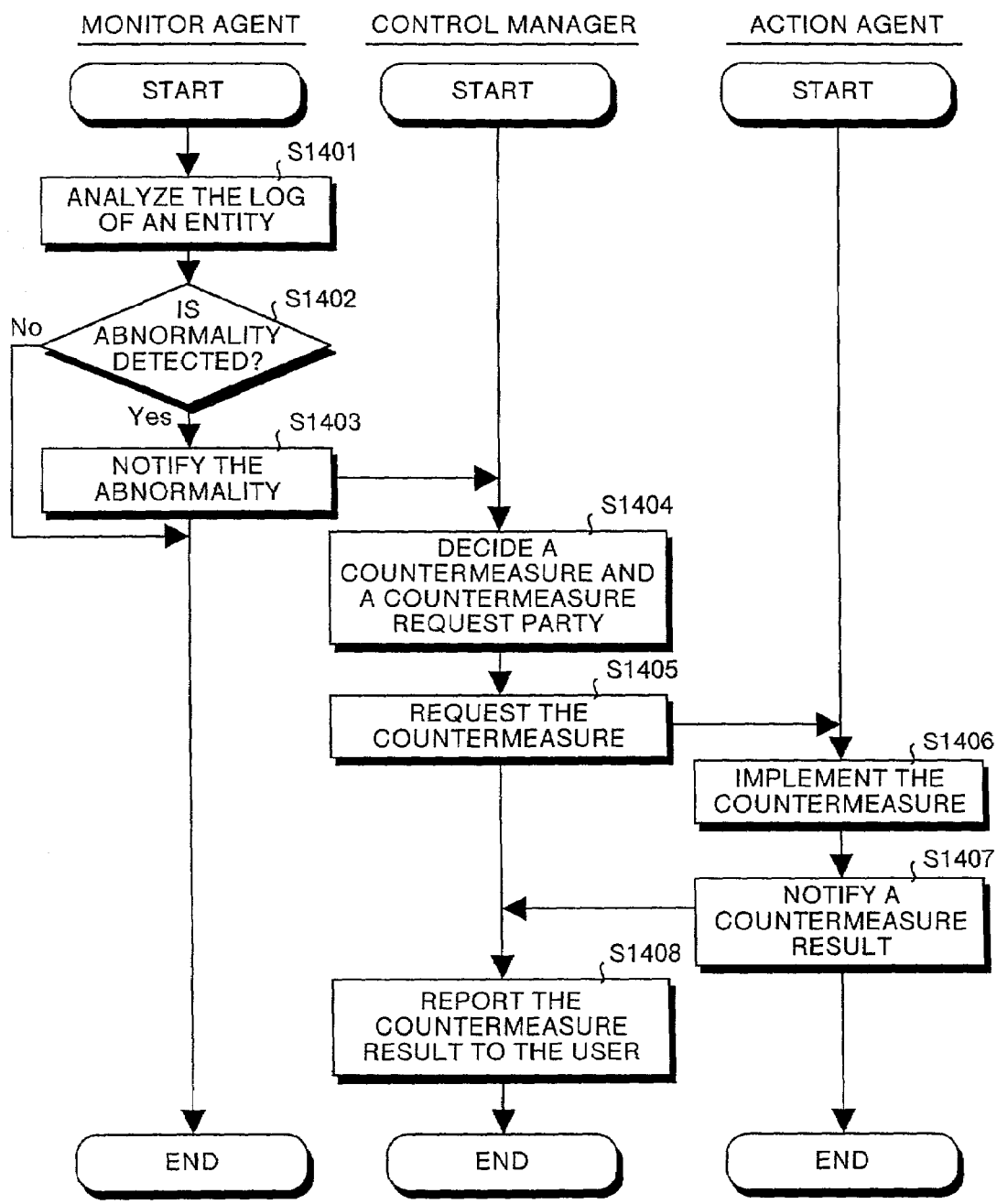
FIG. 14 is a flow chart showing the procedure from the time the monitor agent detects abnormality to the time the action agent performs a countermeasure.

FIG. 14 is a flow chart showing a procedure from the time the monitor agent 203 detects abnormality to the time the action agent 204 performs a countermeasure. As shown in the drawing, the monitor agent 204 analyzes a log of an entity (step S1401) to confirm whether there is abnormality or not. As a result, when abnormality is detected (step S1402 YES), the abnormality is notified to the control manager 202 (step S1403).

Then, the control manager 202 decides a countermeasure and a countermeasure request party (step S1404) referring to the database 201 and the like and requests the countermeasure from the action agent 204 being the countermeasure request party (step S1405).

The action agent 204 receiving the request of the countermeasure performs an instructed countermeasure (step S1406) and notifies the control manager 202 of a countermeasure result (step S1407). The control manager 202 which has received this countermeasure result reports the countermeasure result to the user by displaying the countermeasure result or the like (step S1408).

Figure 15:
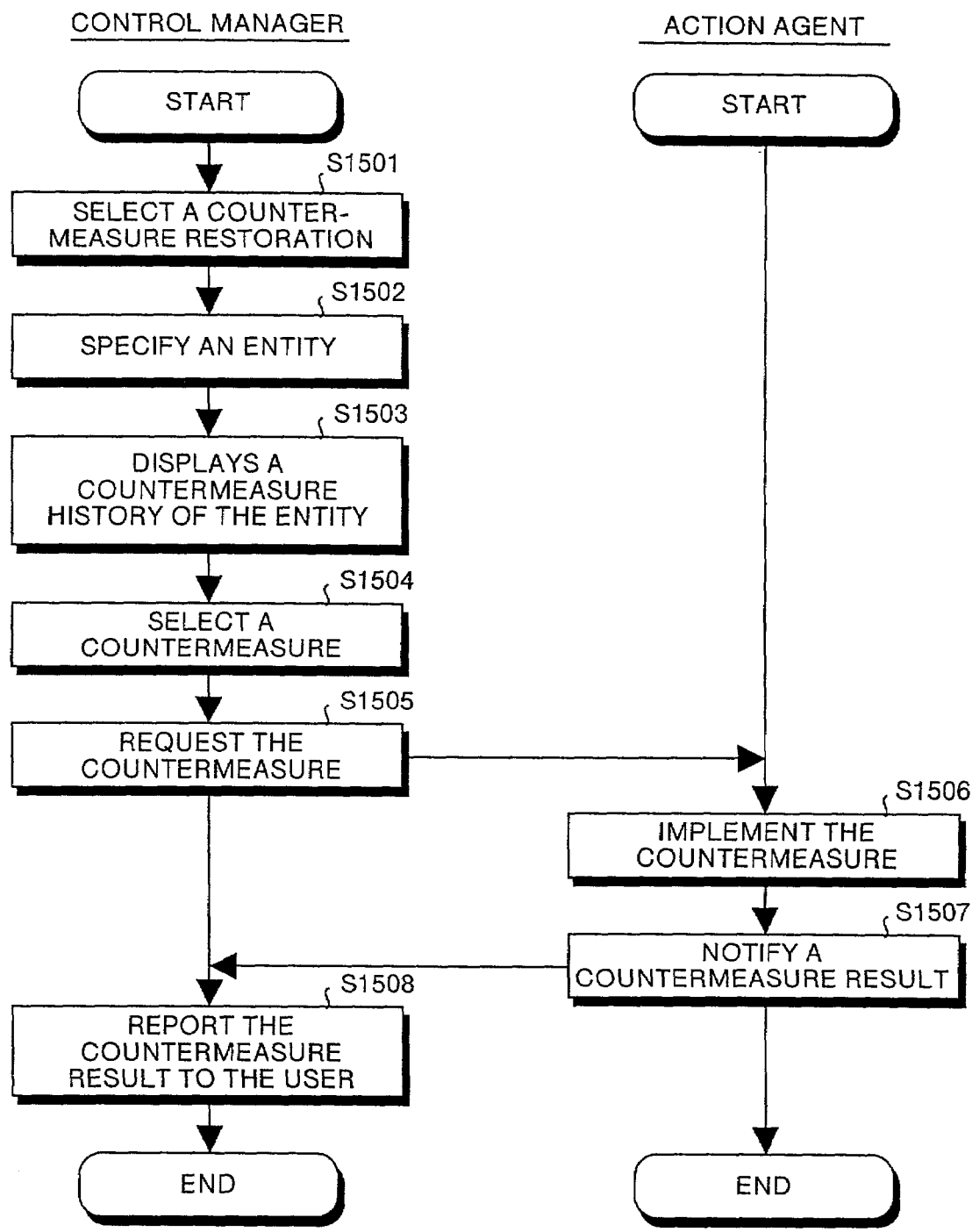
FIG. 15 is a flow chart showing the procedure of the case wherein an entity is returned to the state before a countermeasure is implemented.

Since the user often desires that the entity is returned to the state where the countermeasure has not been performed, a countermeasure restoration of such entity is made possible in the present embodiment. FIG. 15 is a flow chart showing a procedure of the case where an entity is returned to the state where a countermeasure has not been performed.

As shown in the drawing, when a user selects "countermeasure restoration" from a menu of the control manager 202 (step S1501) and specifies an entity for restoring the countermeasure (step S1502), the control manager 202 displays a countermeasure history of the specified entity (step S1503).

When the user selects the countermeasure to be restored from the countermeasure history (step S1504), the control manager 202 requests the countermeasure from the action agent 204 to be the countermeasure request party (step S1505).

Then, this action agent 204 implements the requested countermeasure (step S1506) to notify the control manager 202 of the countermeasure result (step S1507), and the control manager 202 reports this countermeasure result to the user (step S1508).

Figure 16:
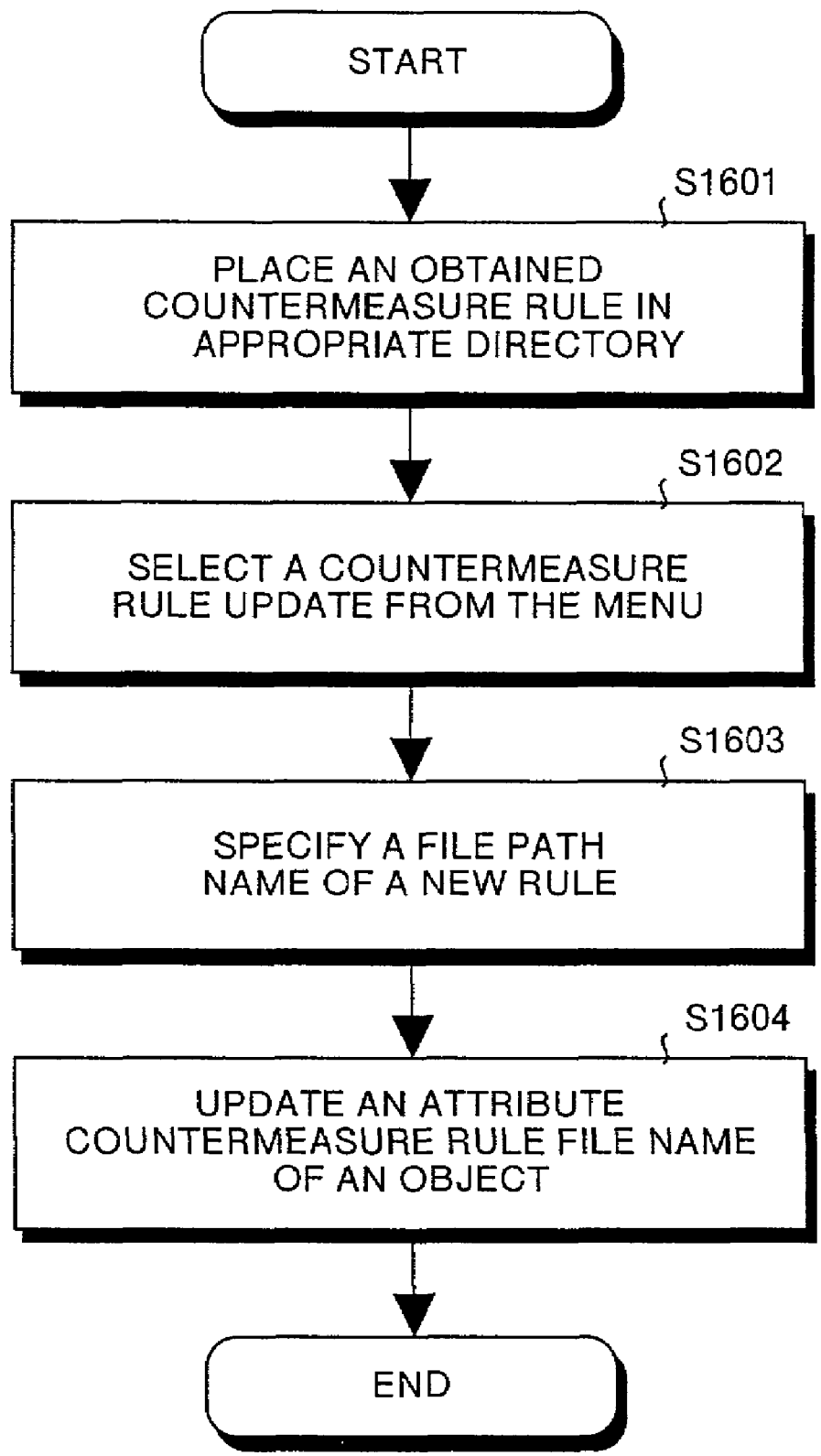
FIG. 16 is an explanatory chart for explaining the update procedure of the countermeasure rule in the control manger shown in FIG. 2.

Next, an update procedure of a countermeasure rule in the control manager 202 shown in FIG. 2 is explained. FIG. 16 is an explanatory chart for explaining the update procedure of the countermeasure rule in the control manager 202 shown in FIG. 2. As shown in the drawing, the user places the obtained countermeasure rule on an appropriate (predetermined)

directory (step S1601) to select "countermeasure rule update" from the menu of the control manager 202 (step S1602).

When the user specifies a file path name of a new countermeasure rule (step S1603), the control manager 202 updates an attribute of an object and a countermeasure rule file name (step S1604).

Figure 17:
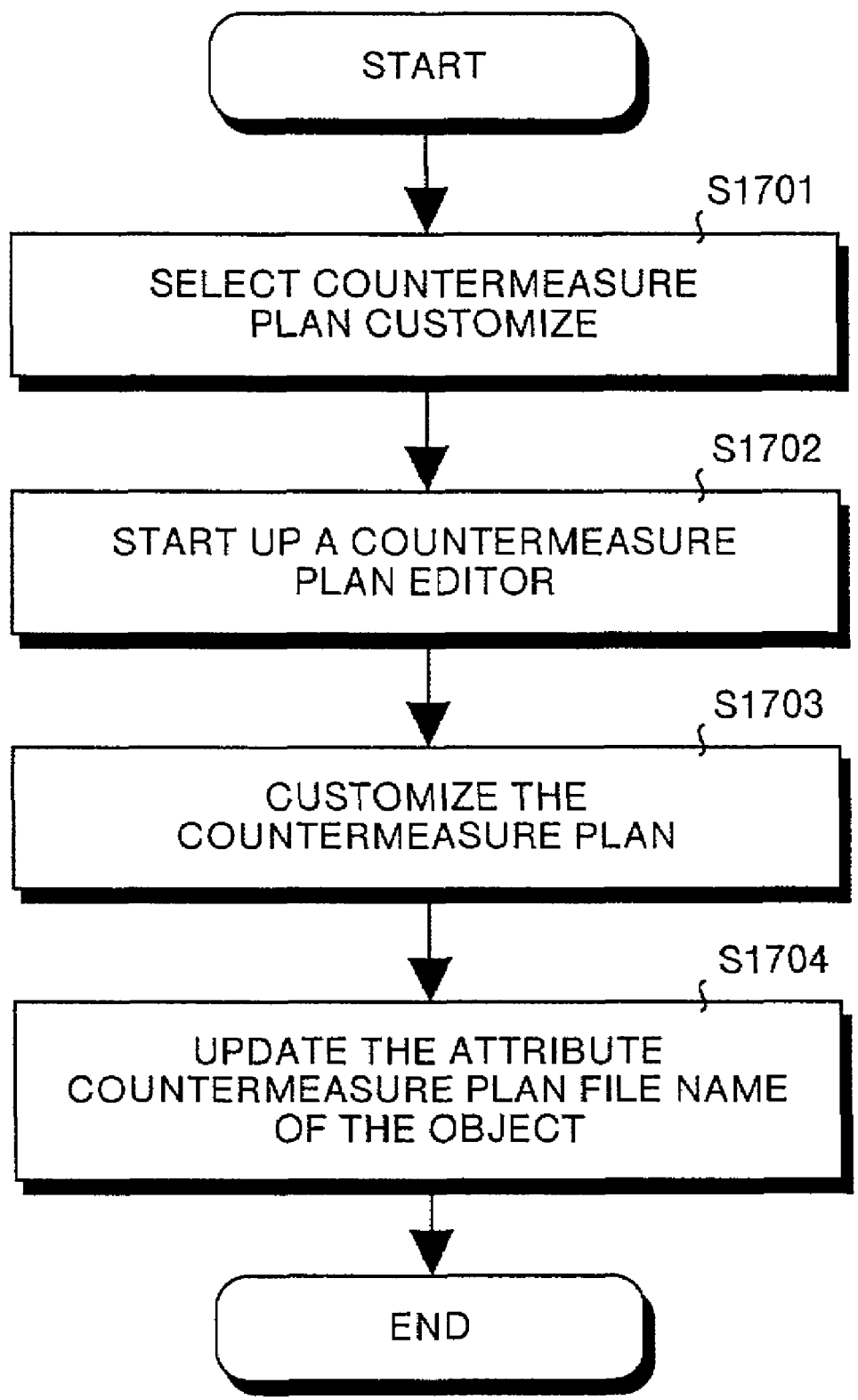
FIG. 17 is a flow chart showing the procedure of the time the countermeasure plan is customized in the control manger shown in FIG. 2.

Next, a procedure of the time when a countermeasure plan is customized in the control manager 202 shown in FIG. 2 is explained. FIG. 17 is a flowchart showing the procedure of the time when the countermeasure plan is customized in the control manager 202 shown in FIG. 2.

As shown in the drawing, when the user selects "countermeasure plan customize" from the menu of the control manager 202 (step S1701), the control manager 202 starts up a countermeasure plan editor editing the countermeasure plan (step S1702).

When this countermeasure plan editor is started up, the user customizes the countermeasure plan, employing the editor (step S1703), and the control manager 202 updates the attribute of the object and the countermeasure plan file name (step S1704).

Figure 18:
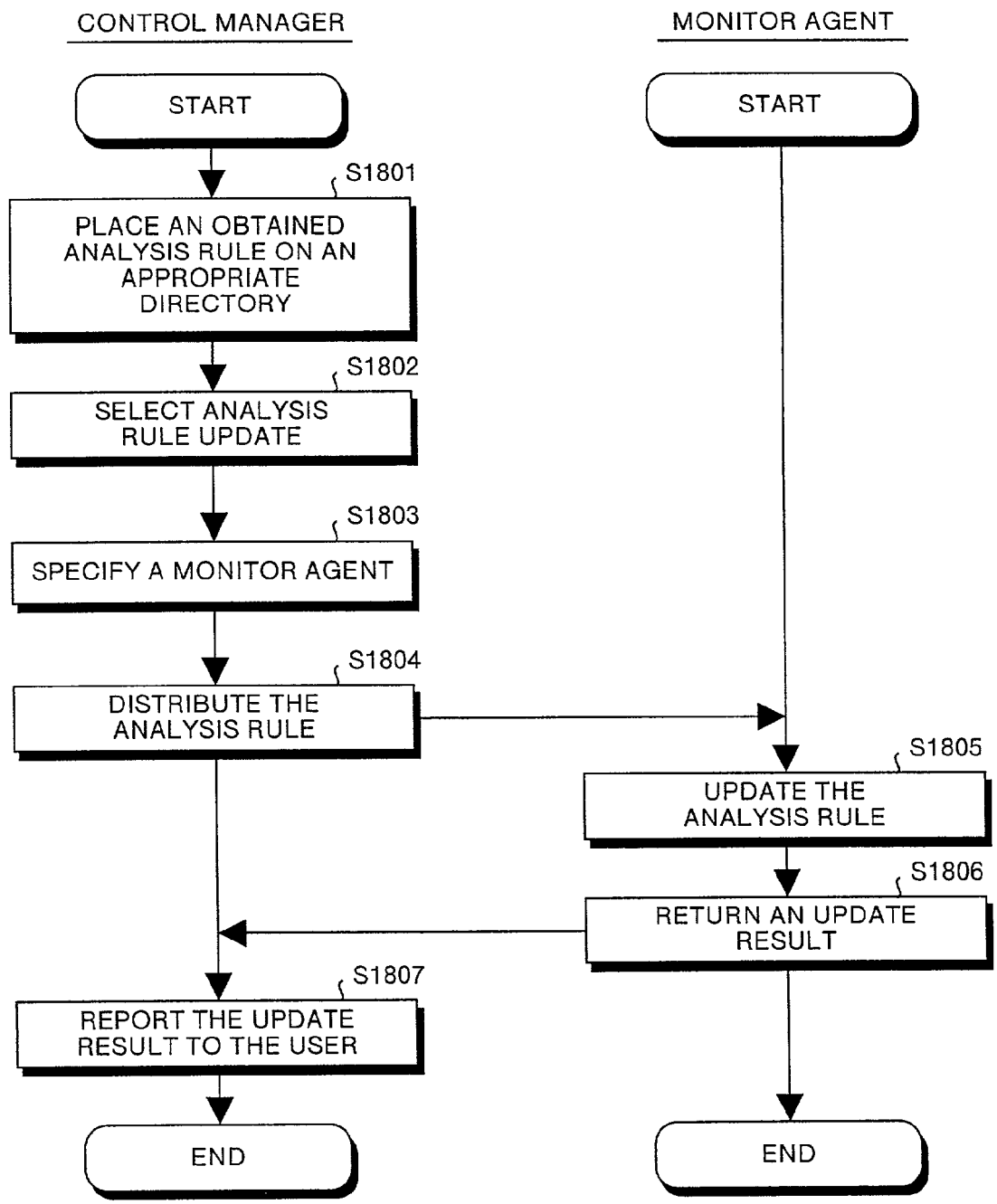
FIG. 18 is a flow chart showing the procedure of the control manager and the monitor agent when the analysis rule is updated.

Next, a procedure of the control manager 202 and the monitor agent 203 of the time when an analysis rule is updated is explained. FIG. 18 is a flow chart showing the procedure of the control manager 202 and the monitor agent 203 of the time when the analysis rule is updated.

As shown in the drawing, when the user places an obtained analysis rule on an appropriate directory (step S1801), selects "analysis rule update" from the menu of the control manager 202 (step S1802), and specifies a file path name of the new analysis rule and a monitor agent 203 to which the analysis rule is sent (step S1803), the control manager 202 distributes this analysis rule to the monitor agent 203 (step S1804).

Then, this monitor agent 203 updates the analysis rule (step S1805) and returns an update result to the control manager 202 (step S1806), and the control manager 202 reports the update result to the user (step S1807).

Figure 19:
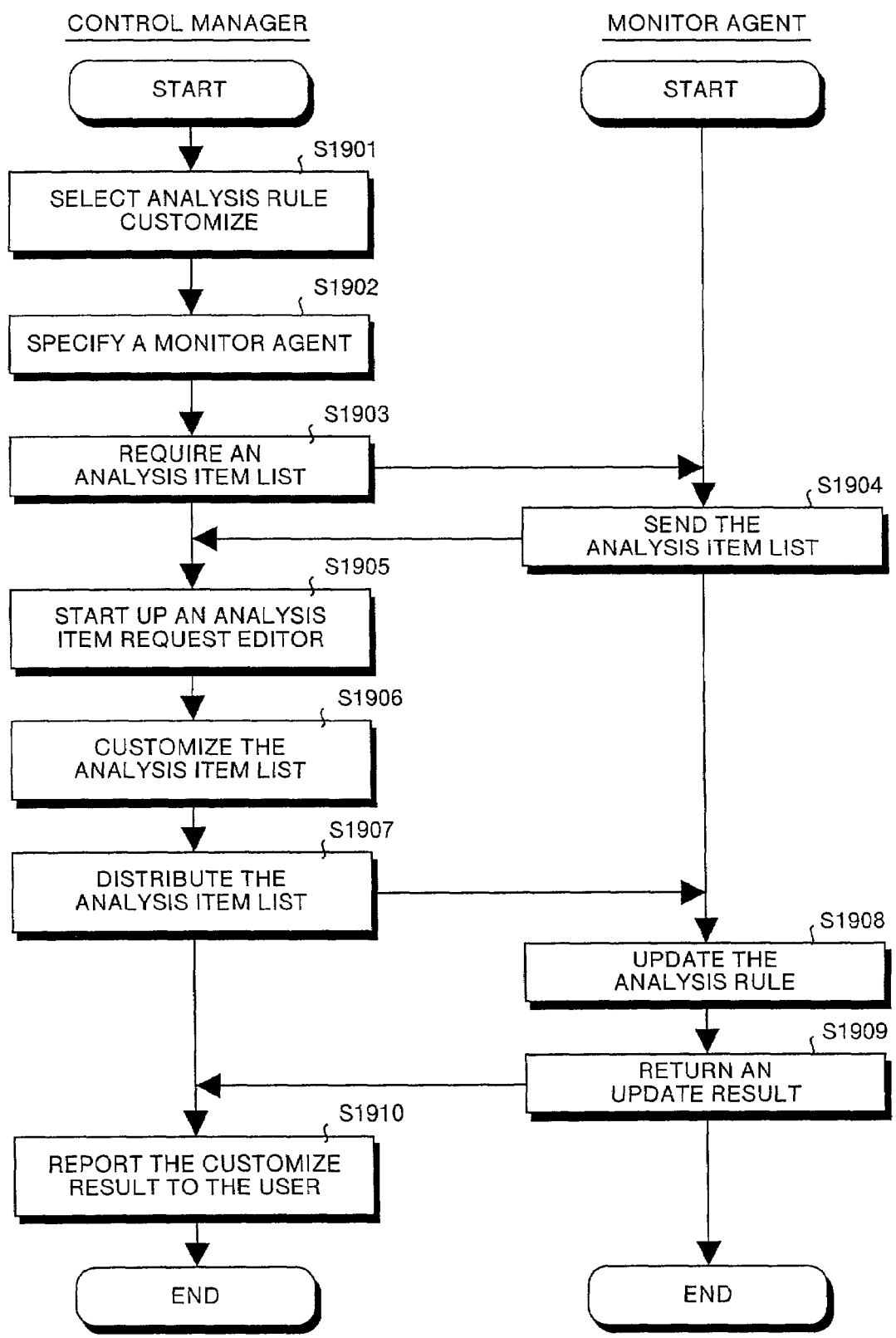
FIG. 19 is a flow chart showing the procedure of the control manager and the monitor agent when the analysis rule is customized.

Next, a procedure of the control manager 202 and the monitor agent 203 of the time when an analysis rule is customized is explained. FIG. 19 is a flow chart showing the procedure of the control manager 202 and the monitor agent 203 of the time when the analysis rule is customized.

As shown in the drawing, when the user selects "analysis rule customize" from the menu of the control manager 202 (step S1901) and specifies a monitor agent 203 customizing the analysis rule (step S1902), the control manager 202 requires an analysis item list being a customizable part of the analysis rule of the specified monitor agent 203 (step S1903).

Then, the monitor agent 203 receiving the requirement sends the analysis item list to the control manager 202 (step S1904), and the control manager 202 starts up an analysis item editor editing the analysis item list (step S1905).

Thereafter, a user customizes the analysis item list, employing the analysis item editor (step S1906), and the control manager 202 distributes the customized analysis item list to the monitor agent 203 (step S1907).

The monitor agent 203 updates the analysis item list (step S1908) and then returns an update result to the control manager 202 (step S1909), and the control manager 202 reports the customize result to the user (step S1910).

Figure 20:
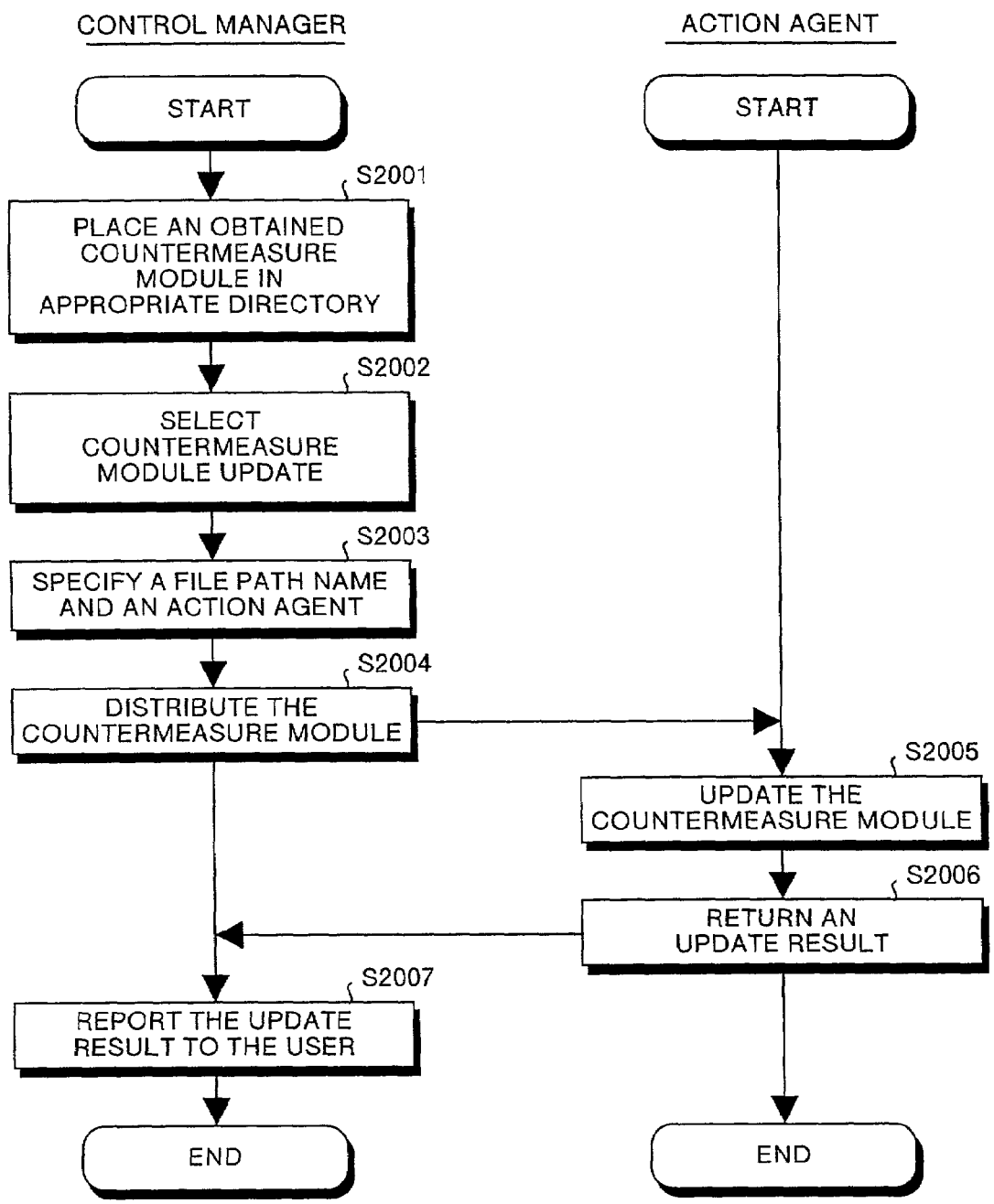
FIG. 20 is a flow chart showing the update procedure of the countermeasure module.

Next, an update procedure of a countermeasure module is explained. FIG. 20 is a flow chart showing the update procedure of a countermeasure module. As shown in the drawing, when the user places an obtained countermeasure module on an appropriate directory (step S2001), selects "countermeasure module update" from the menu of the control manager 202 (step S2002), and specifies a file path name of the new countermeasure module and an action agent 204 sending the countermeasure module (step S2003), the control manager 202 distributes the countermeasure module to the corresponding action agent 204 (step S2004).

The action agent 204 updates the countermeasure module (step S2005) and then returns an update result to the control manager 202 (step S2006), and the control manager 202 reports the update result to the user (step S2007).

Next, a data structure of a detection notification and an ACK given/received between the control manager 202 and the monitor agent 203 is explained. FIG. 21A explains exchange of the detection notification and the ACK between the control manager 202 and the monitor agent 203, FIG. 21B shows an example of the data structure of the detection notification, and FIG. 21C shows an example of the data structure of the ACK.

As shown in FIG. 21A, the monitor agent 203, when detecting abnormality of an entity, transmits a detection notification to the control manager 202, and the monitor agent 203, when accepting this detection notification, returns an ACK to the monitor agent 203.

As shown in FIG. 21B, this detection notification 2101 is composed of an OP code, an agent ID, a sequence number, an event identifier, a damage identifier, an entity ID, an entity log, time, and a countermeasure parameter. Here, this agent ID is an object ID specifying an agent directly, and the sequence number is consecutive numbers that the monitor agent 203 appended to the detection notification. The event identifier is information by which the monitor agent 203 directly distinguishes a detected event, and the damage identifier is information representing whether or not there is a possibility that the monitor agent 203 has sustained damage or sustains damage by the detected event. The entity ID is the ID of an entity in which the monitor agent 203 detects abnormality, and the entity log is the log of an entity that the monitor agent 203 detects.

As shown in FIG. 21C, the ACK 2102 is composed of an OP code and a sequence number. This sequence number is consecutive numbers that the monitor agent 203 appends to the detection notification.

Figure 22A:
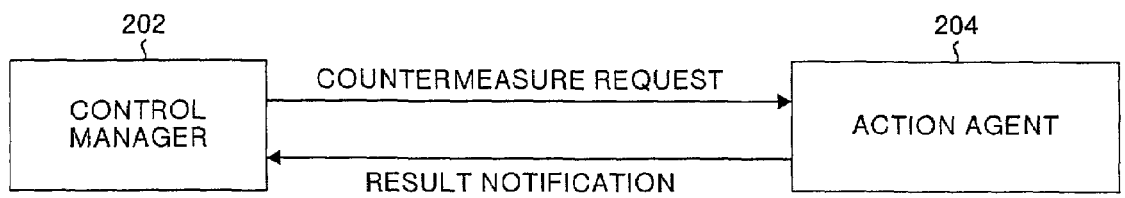
FIG. 22A explains exchange of the countermeasure request and the result notification between the control manager and the action agent.

Next, a data structure of a countermeasure request and a result notification given/received between the control manager 202 and the action agent 204 is explained. FIG. 22A explains exchange of the countermeasure request and the result notification between the control manager 202 and the action agent 204, FIG. 22B shows an example of the data structure of the countermeasure request, and FIG. 22C shows an example of the data structure of the result notification.

As shown in FIG. 22A, the monitor agent 203, after deciding a countermeasure and a countermeasure request party, sends the countermeasure request to the action agent 204. The action agent 204, after receiving this countermeasure request, implements the countermeasure specified through the countermeasure request and returns a countermeasure result to the control manager 202.

Figure 22B:
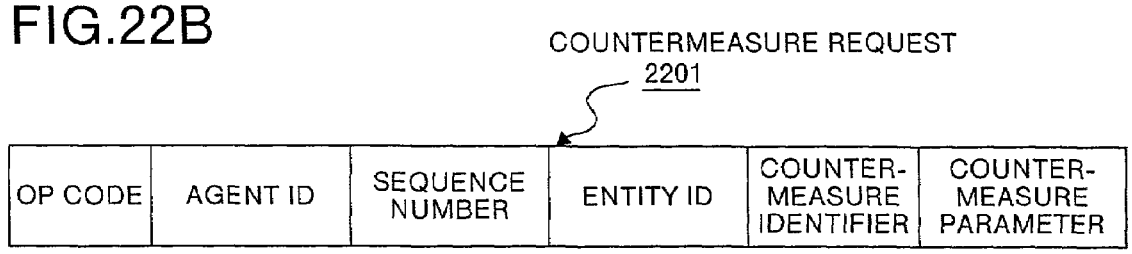
FIG. 22B shows an example of the data structure of the countermeasure request.

As shown in FIG. 22B, the countermeasure request 2201 is composed of an OP code, an agent ID, a sequence number, an entity ID, a countermeasure identifier, and a countermeasure parameter. Here, the sequence number is consecutive numbers that the control manager 202 appends to the countermeasure request, the countermeasure identifier is information for directly distinguishing a countermeasure function that the action agent 204 holds, and the countermeasure parameter is one obtained by dividing for each filed the log of an entity in which the monitor agent 203 causes abnormality.

Figure 22C:
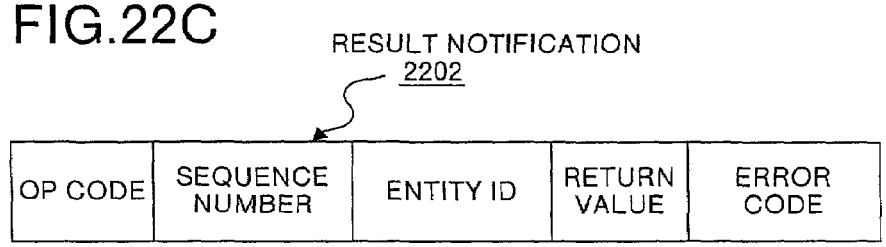
FIG. 22C shows an example of the data structure of the result notification.

As shown in FIG. 22C, the result notification 2202 is composed of an OP code, a sequence number, an entity ID, a return value, and an error code. Here, the sequence number is consecutive numbers that the control manager 202 appends to the countermeasure request, the entity ID is the ID of an entity whose setting the action agent 204 has changed, and the return value is the value that the entity returns due to the setting change. The error code becomes "E_OK" when a countermeasure is implemented, becomes "E_UNKNOWN" when an unknown countermeasure identifier is given, becomes "E_LESS_ARG" when a countermeasure parameter is lacked, and becomes "E_UNDEF" when an unexpected error occurs.

Figure 23A:
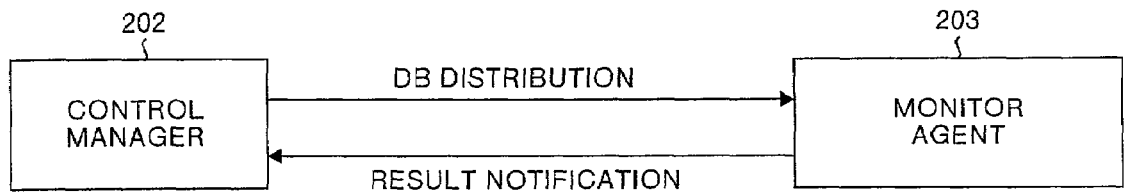
FIG. 23A explains exchange of the DB (analysis rule) distribution and the result notification between the control manager and the monitor agent.

Next, a data structure of a DB (analysis rule) distribution and a result notification given/received between the control manager 202 and the monitor agent 203 is explained. FIG. 23A explains exchange of the DB (analysis rule) distribution and the result notification between the control manager 202 and the monitor agent 203, FIG. 23B shows an example of the data structure of the DB distribution, and FIG. 23C shows an example of the data structure of the result notification.

As shown in FIG. 23A, in order to update the analysis rule of the monitor agent 203, the control manager 202 distributes the DB (analysis rule) to the monitor agent 203. The monitor agent 203, when receiving this DB distribution, takes in the distributed analysis rule and returns a taken-in result to the control manager 202.

Figure 23B:
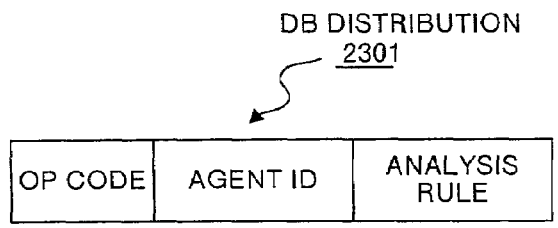
FIG. 23B shows an example of the data structure of the DB distribution.

As shown in FIG. 23B, the DB distribution 2301 is composed of an OP code, an agent ID, and an analysis rule. Here, the agent ID is an object ID directly specifying an agent, and the analysis rule is an analysis rule to be a distribution object.

Figure 23C:
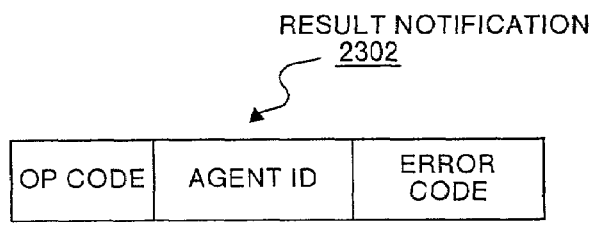
FIG. 23C shows an example of the data structure of the result notification.

As shown in FIG. 23C, the result notification 2302 is composed of an OP code, an agent ID, and an error code. Here, the agent ID is an object ID directly specifying an agent, and the error code becomes "E_OK" when succeeding in an update, becomes "E_UNKNOWN" when being not able to recognize the format of a distributed rule, becomes "E_OLD_VER" when the distributed rule is old (including the same edition), and becomes "E_UNDEF" when an unexpected error occurs during an update process.

Figure 24A:
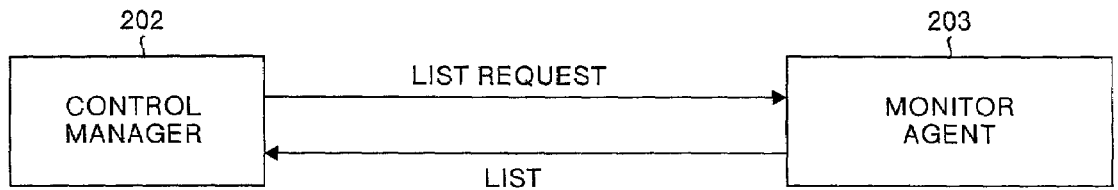
FIG. 24A explains exchange of the list request and the list between the control manager and the monitor agent.

Next, a data structure of a list request and a list given/received between the control manager 202 and the monitor agent 203 is explained. FIG. 24A explains exchange of the list request and the list between the control manager 202 and the monitor agent 203, FIG. 24B shows an example of the data structure of the list request, and FIG. 24C shows an example of the data structure of the list.

As shown in FIG. 24A, in order to customize an analysis item of the monitor agent 203, the control manager 202 requests an analysis item list of the monitor agent 203. This monitor agent 203, when accepting this list request, returns the analysis item list to the control manager 202.

Figure 24B:
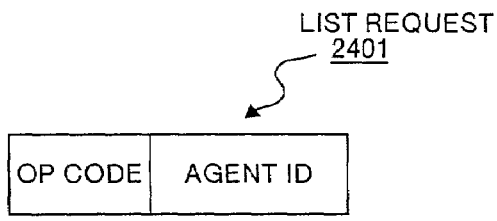
FIG. 24B shows an example of the data structure of the list request.

As shown in FIG. 24B, this list request 2401 is composed of an OP code and an agent ID, and this agent ID is an object ID directly specifying an agent.

Figure 24C:
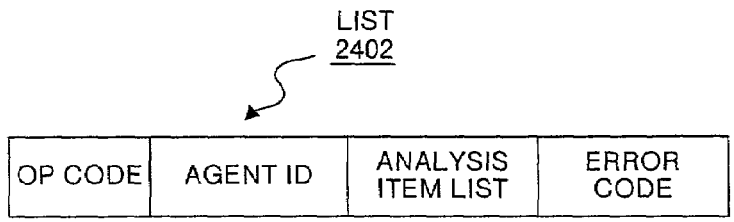
FIG. 24C shows an example of the data structure of the list.

As shown in FIG. 24C, the list 2402 is composed of an OP code, an agent ID, an analysis item list, and an error code. Here, the agent ID is an object ID directly specifying an agent, the analysis item list is a present analysis item list of the monitor agent, and the error code becomes "E_OK" usually and becomes "E_UNDEF" when an unexpected error occurs during an update.

Next, a data structure of a list distribution and a result notification given/received between the control manager 202 and the monitor agent 203 is explained.

Figure 25A:
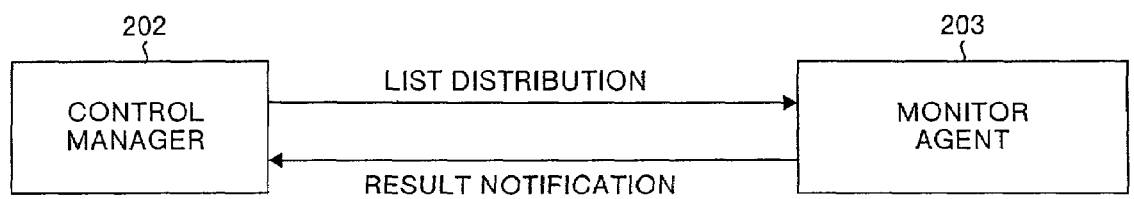
FIG. 25A explains exchange of the list distribution and the result notification between the control manager and the monitor agent.
Figure 25B:
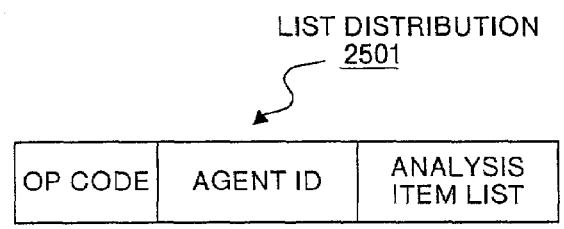
FIG. 25B shows an example of the data structure of the list distribution.
Figure 25C:
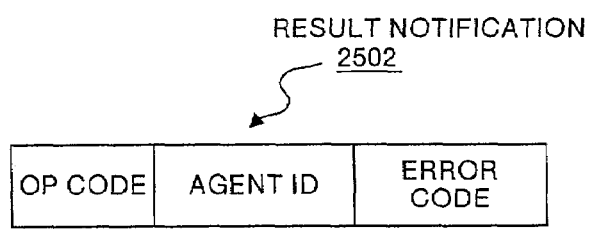
FIG. 25C shows an example of the data structure of the result notification.

FIG. 25A explains exchange of the list distribution and the result notification between the control manager 202 and the monitor agent 203, FIG. 25B shows an example of the data structure of the list distribution, and FIG. 25C shows an example of the data structure of the result notification.

As shown in FIG. 25A, in order to customize an analysis item of the monitor agent 203, the control manager 202 distributes an analysis item list to the monitor agent 203. This monitor agent 203, when receiving the list distribution, takes in the distributed analysis item list and returns a taken-in result to the control manager 202.

As shown in FIG. 25B, the list distribution 2501 is composed of an OP code, an agent ID, and an analysis item list. Here, the agent ID is an object ID directly specifying an agent, and the analysis item list is an analysis item list to be a distribution object.

As shown in FIG. 25C, a result notification 2502 is composed of an OP code, an agent ID, and an error code. Here, the agent ID is an object ID directly specifying an agent, and the error code becomes "E_OK" when succeeding in an update, becomes "E_UNKNOWN" when being not able to recognize the format of a distributed analysis list, becomes "E_OLD_VER" when the distributed analysis list is old (including the same edition), and becomes "E_UNDEF" when an unexpected error occurs during an update process.

Figure 26A:
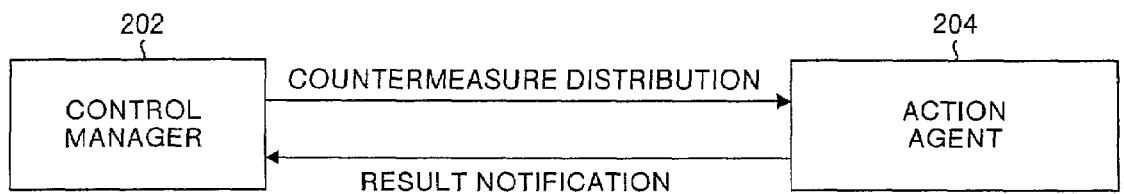
FIG. 26A explains exchange of the countermeasure distribution and the result notification between the control manager and the action agent.

Next, a data structure of a countermeasure distribution and a result notification given/received between the control manager 202 and the action agent 204 is explained. FIG. 26A explains exchange of the countermeasure distribution and the result notification between the control manager 202 and the action agent 204, FIG. 26B shows an example of the data structure of the countermeasure distribution, and FIG. 26C shows an example of the data structure of the result notification.

As shown in FIG. 26A, in order to update a countermeasure module of the action agent 204, the control manager 202 distributes the countermeasure module to the action agent 204. The action agent 204, when accepting the countermeasure module, takes in the distributed countermeasure module to return a taken-in result to the control manager 202.

Figure 26B:
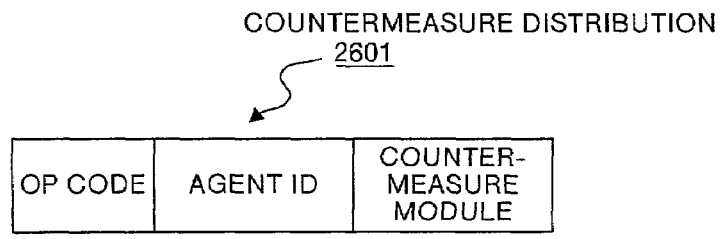
FIG. 26B shows an example of the data structure of the countermeasure distribution.

As shown in FIG. 26B, the countermeasure distribution 2601 is composed of an OP code, an agent ID, and a countermeasure module. Here, the agent ID is an object ID directly specifying an agent, and the countermeasure module is a countermeasure to be a distribution object.

Figure 26C:
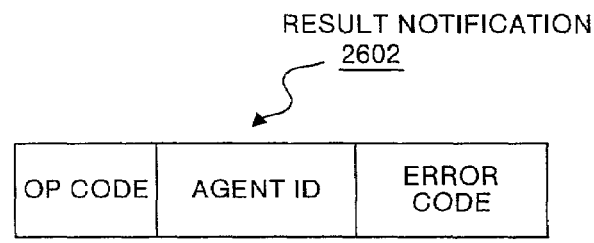
FIG. 26C shows an example of the data structure of the result notification.

As shown in FIG. 26C, the result notification 2602 is composed of an OP code, an agent ID, and an error code. Here, the agent ID is an object ID directly specifying an agent, and the error code becomes "E_OK" when succeeding in an update, becomes "E_UNKNOWN" when being not able to recognize the format of the distributed countermeasure module, becomes "E_OLD_VER" when the distributed countermeasure module is old (including the same edition), and becomes "E_UNDEF" when an unexpected error occurs during an update process.

Figure 27:
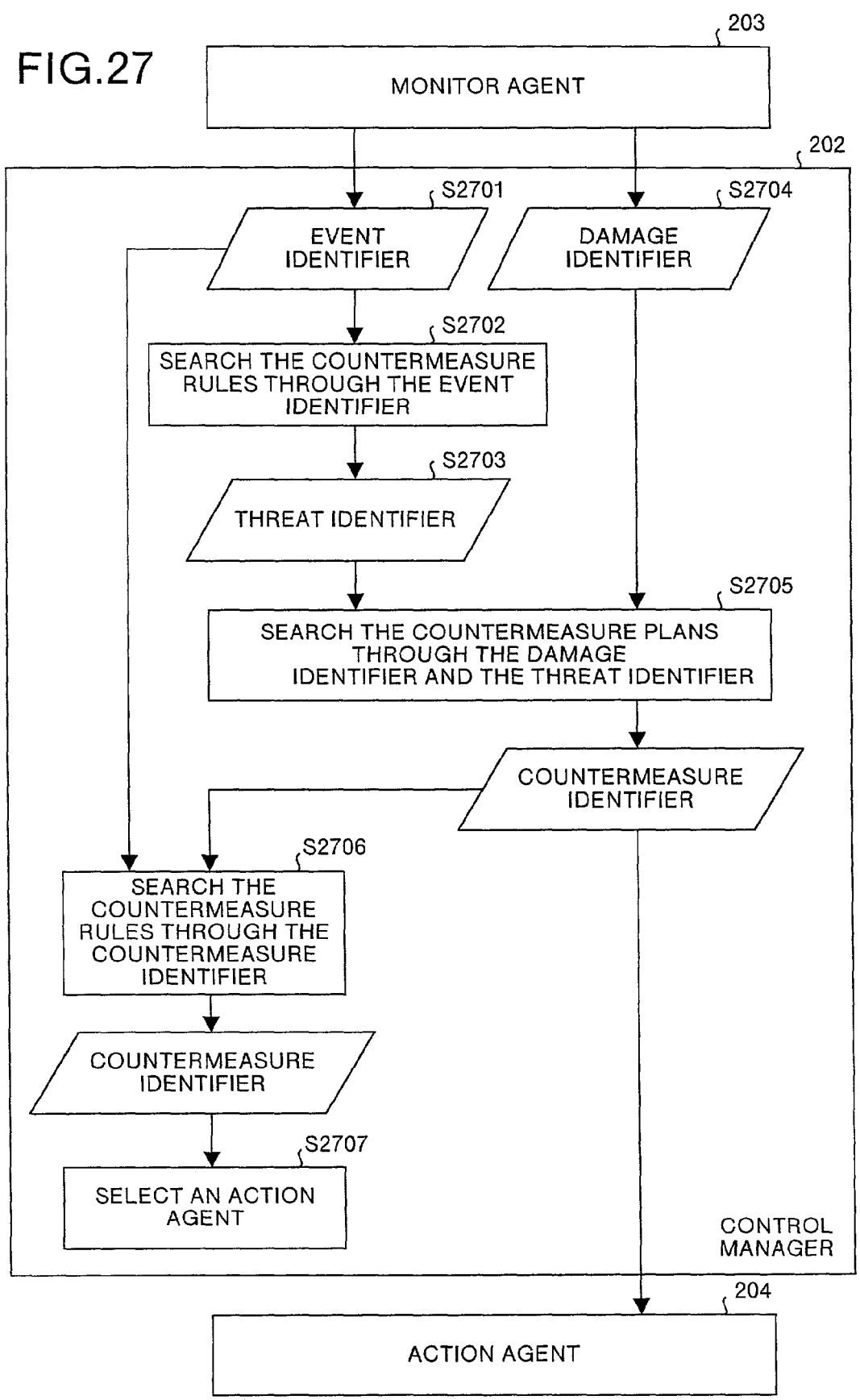
FIG. 27 is an explanatory chart for explaining the countermeasure decision process that the control manager shown in FIG. 2 performs.

Next, a countermeasure decision process that the control manager 202 shown in FIG. 2 performs is explained. FIG. 27 is an explanatory chart for explaining the countermeasure decision process that the control manager 202 shown in FIG. 2 performs.

The control manager 202 shown in the drawing decides a countermeasure employing a countermeasure plan and a countermeasure request party. Here, the countermeasure plan is a rule for deciding which countermeasure rule is selected when there are a plurality of countermeasure rules having the same event identifier and is composed of a tuple of a damage identifier, a threat identifier, and a countermeasure identifier.

Specifically, when the control manager 202 receives the event identifier from the monitor agent 203 (step S2701), a countermeasure rule is searched through the event identifier (step S2702), and a threat identifier is acquired (step S2703).

Then, a damage identifier is acquired through a different monitor agent 203 (step S2704), and a countermeasure plan is searched through the damage identifier and the threat identifier (step S2705).

A countermeasure rule is searched through the searched countermeasure identifier (step S2706), an action agent 204 is selected based upon the countermeasure identifier (step S2707), and a countermeasure is designated for the selected action agent 204.

The damage identifier is an identifier representing whether or not there is a possibility of sustaining damage by an event that the monitor agent 203 detects, and there are three kinds of damage identifiers of "there is damage," "there is not damage," and "discrimination impossible." The damage identifier is included in the detection notification sent to the control manager 202 when the monitor agent 203 detects abnormality.

The threat identifier is an identifier representing the kind (size) of damage which may be sustained by an event that the monitor agent 203 detects. The kind of damage is decided by an event and is included in the countermeasure rule.

The countermeasure identifier is an identifier directly representing a countermeasure that can be implemented in the action agent 204 and is included in the countermeasure request that the control manager 202 sends to the action agent 204. The countermeasure designator is a designator representing to which action agent 204 the control manager 202 sends a countermeasure request.

The event identifier is an identifier directly representing an event that the monitor agent 203 detects and is included in a detection notification that the monitor agent 203 sends to the control manager 202 when detecting abnormality.

Next, one example of countermeasure plans is explained. FIG. 28A to FIG. 28D shows examples of the countermeasure plans. When there are the countermeasure plans and the countermeasure rules shown in the drawing, the control manager 202, while employing the countermeasure plans and the countermeasure rules, decides a countermeasure and a countermeasure request party.

For example, as shown in FIG. 28A, when the monitor agent 203 detects "event 0001" and notifies the control manager 202 of "there is damage," the control manager 202 searches the countermeasure rules shown in FIG. 28B, using "event 0001" as a search key. Although two countermeasure rules hit as shown in FIG. 28B, the threat identifiers always become the same (here, become "threat 0001").

The control manager 202 searches the countermeasure plans shown in FIG. 28C, using "there is damage" and "threat 0001" as search keys, and selects "countermeasure 0001" from a column of the countermeasure identifier of the countermeasure plan.

Thereafter, as shown in FIG. 28D, a rule including "countermeasure 0001" is selected among two hit countermeasure rules, and "SERVER" is selected from a column of the countermeasure designator as a countermeasure request party. When the monitor agent 203 detects "event 0001" and notifies the control manager 202 of "damage unclear," "countermeasure 0002" is selected as a countermeasure.

Thus, the countermeasure rules are ones in which all countermeasures which may be taken to events are enumerated, the countermeasure plans are rules for selecting an enumerated countermeasure rule, and the selection is performed depending upon whether or not there is damage and upon the size of the damage. Although the countermeasure rules and the countermeasure plans may be formed into one, the two parties are separated in order to customize a countermeasure selected depending upon whether or not there is damage and upon the size of the damage by a policy of a website operating the system. Thus, a user can customize a countermeasure plan.

Figure 29:
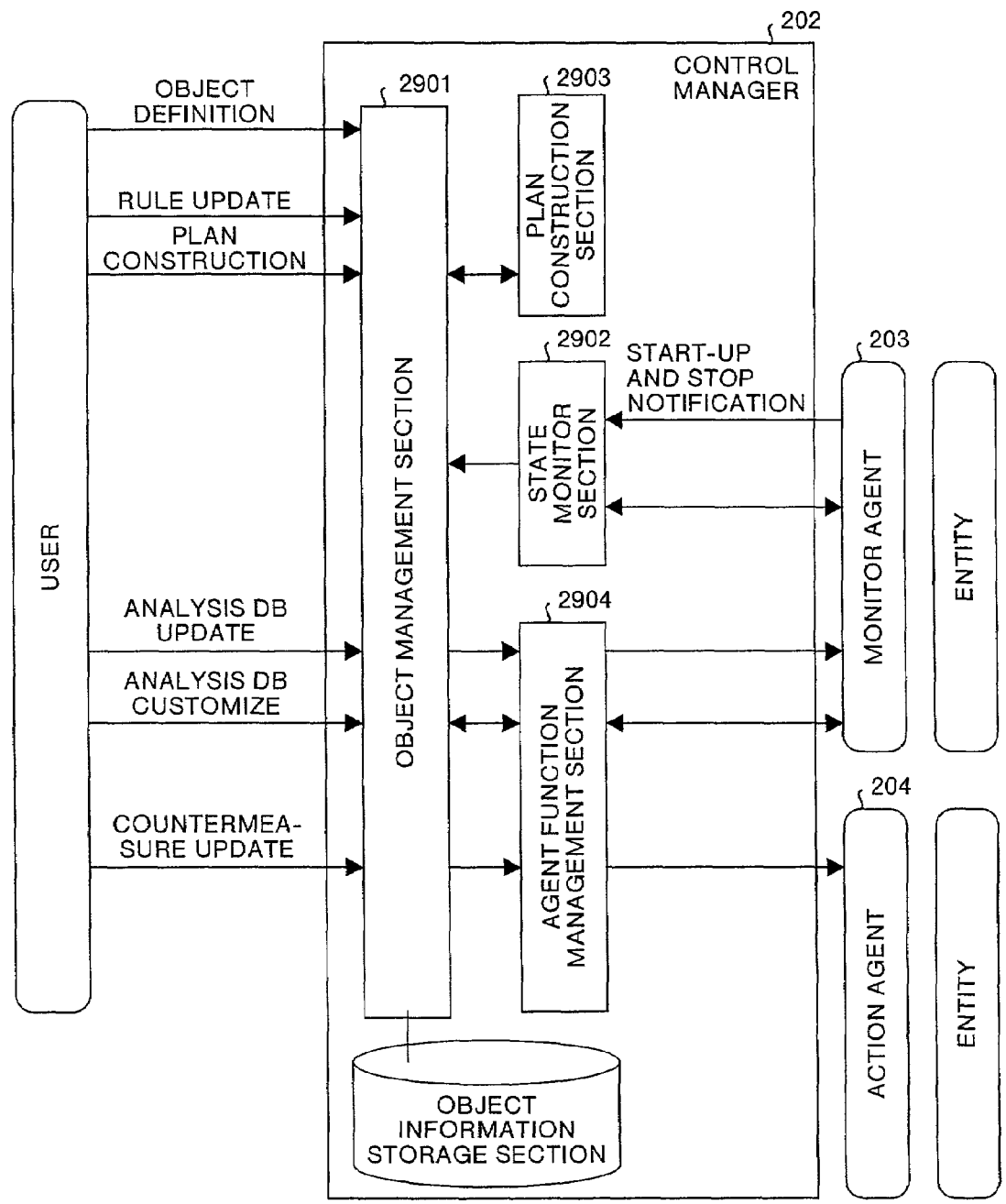
FIG. 29 is a block diagram showing the functional configuration of the control manager shown in FIG. 2.
Figure 30:
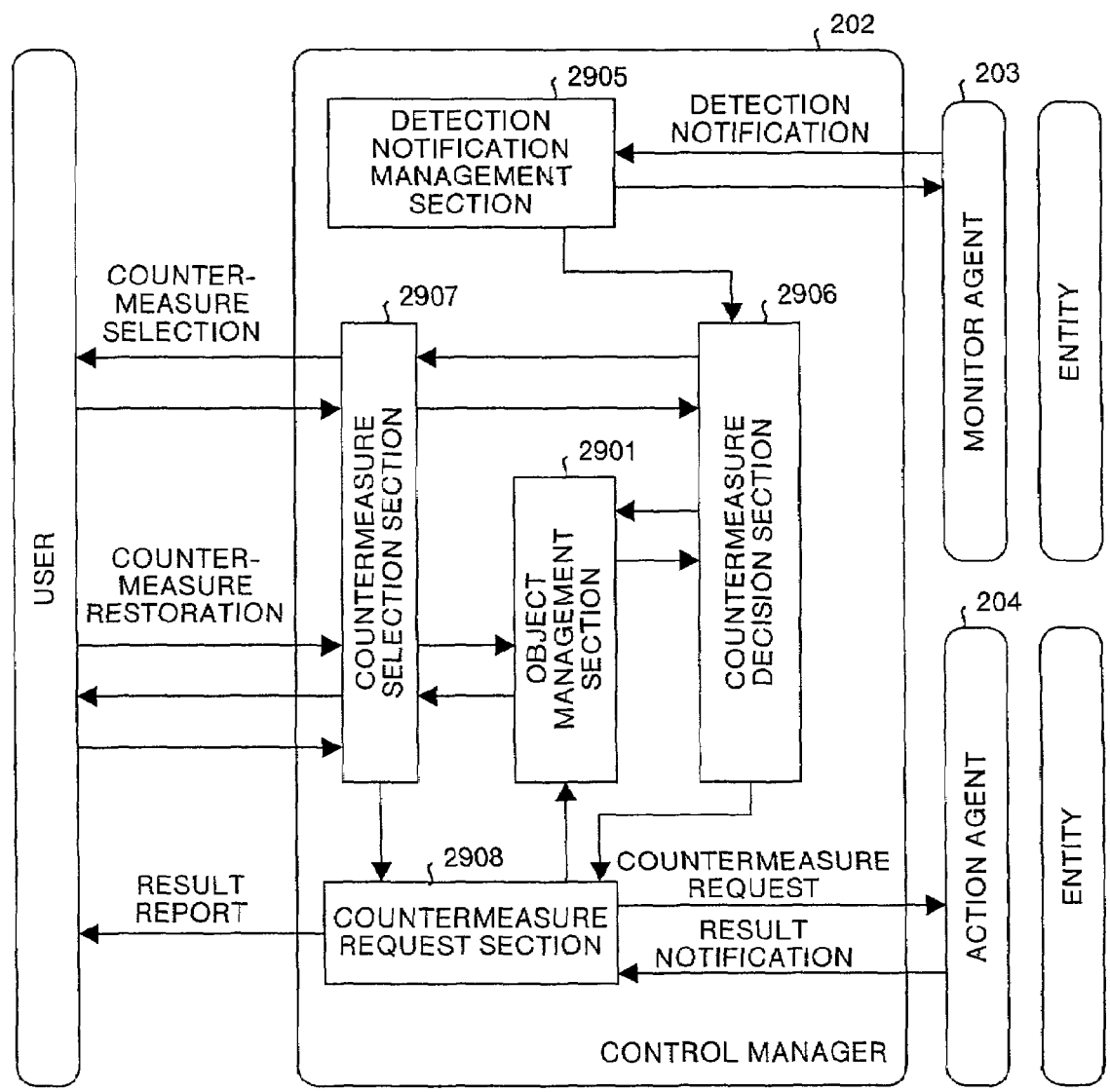
FIG. 30 is a block diagram showing the functional configuration of the control manager shown in FIG. 2.

Next, a functional configuration of the control manager 202 shown in FIG. 2 is explained. FIG. 29 and FIG. 30 are block diagrams showing the functional configuration of the control manager 202 shown in FIG. 2.

As shown in FIG. 29, the control manager 202 has an object management section 2901, a state monitor section 2902, a plan construction section 2903, and an agent function management section 2904.

The object management section 2901 is a functional section managing each of the control manager 202, an agent, an entity as an object and manages the countermeasure rule and the countermeasure plan as attributes of control manager objects. A countermeasure decision section described later on searches the countermeasure rule and the countermeasure plan that the object management section 2901 manages in order to decide a countermeasure.

The object management section 2901 manages the structure of an object, and the countermeasure decision section described later on refers to structure information that the object management section 2901 manages in order to decide a countermeasure request party.

The state monitor section 2902 is a functional section confirming the operational state of an agent and periodically communicates with an agent to change the status attribute of an agent object that the object management section 2901 manages, depending upon whether or not there is a response when communication is performed.

The plan construction section 2903 is a functional section customizing a countermeasure plan, and this plan construction section 2903 requests the object management section 2901 to manage a customized countermeasure plan.

The agent function management section 2904 is a functional section updating or customizing the analysis rule of the monitor agent 203 and also updating the countermeasure module of the action agent 204.

As shown in FIG. 30, the control manager 202 has the object management section 2901, a detection notification management section 2905, a countermeasure decision section 2906, a countermeasure selection section 2907, and a countermeasure request section 2908.

The detection notification management section 2905 is a functional section receiving and managing the detection notification sent from the monitor agent 203 and outputs the received detection notification to the countermeasure decision section 2906.

The countermeasure decision section 2906 is a functional section deciding a countermeasure which is requested for action agent 204 and a countermeasure request party through the detection notification given from the detection notification management 2905. The countermeasure decision section 2906 searches the countermeasure rules and the countermeasure plans that the object management section 2901 manages, decides a countermeasure and a countermeasure request party, and outputs them to the countermeasure request section 2908. The countermeasure decision section 2906 selects a plurality of countermeasures and countermeasure request parties and requests a user selection regarding a countermeasure from the countermeasure selection section 2907.

The countermeasure selection section 2907 is a functional section reporting plural countermeasures given from the countermeasure decision section 2906 to a user and requesting the selection from the user. The countermeasure selection section 2907 accepts a countermeasure restoration request from a user and restores a countermeasure.

The countermeasure request section 2908 is a functional section requesting a countermeasure accepted from the countermeasure decision section 2906 of an action agent 204 that the countermeasure request party given from the countermeasure decision section 2906 shows. The countermeasure request section 2908 receives a result notification of the action agent 204 and notifies a user of the countermeasure result. The countermeasure request section 2908 requests management of the countermeasure request or the countermeasure result showing a state change of an entity by the countermeasure from the object management section 2901.

Next, one example of an object that the object management section 2901 manages is explained. FIG. 31 is a table showing a control manager object, FIG. 32 is a table showing an agent object, and FIG. 33 is a table showing an entity object.

As shown in FIG. 31, the control manager object includes ones related to the control manager 202, the countermeasure rule, the countermeasure plan, a log format definition, an agent authorization list, a state monitor, the monitor agent 203, and the action agent 204.

As shown in FIG. 32, the agent object includes ones related to an agent, an entity, and the control manager 202, and as shown in FIG. 33, the entity object includes ones related to an entity, an FW entity, the monitor agent 203, the action agent 204, a countermeasure history, and an entity inherent information.

The object management section 2901 has an object definition function defining an attribute value of an object, an object delete function deleting an object, an object reference function referring to the attribute value of an object, an object change function changing the attribute value of an object, an agent setting file formation supplementary function by which setting of an agent can be completed only by a user placing a formed file, and the like.

Figure 34:
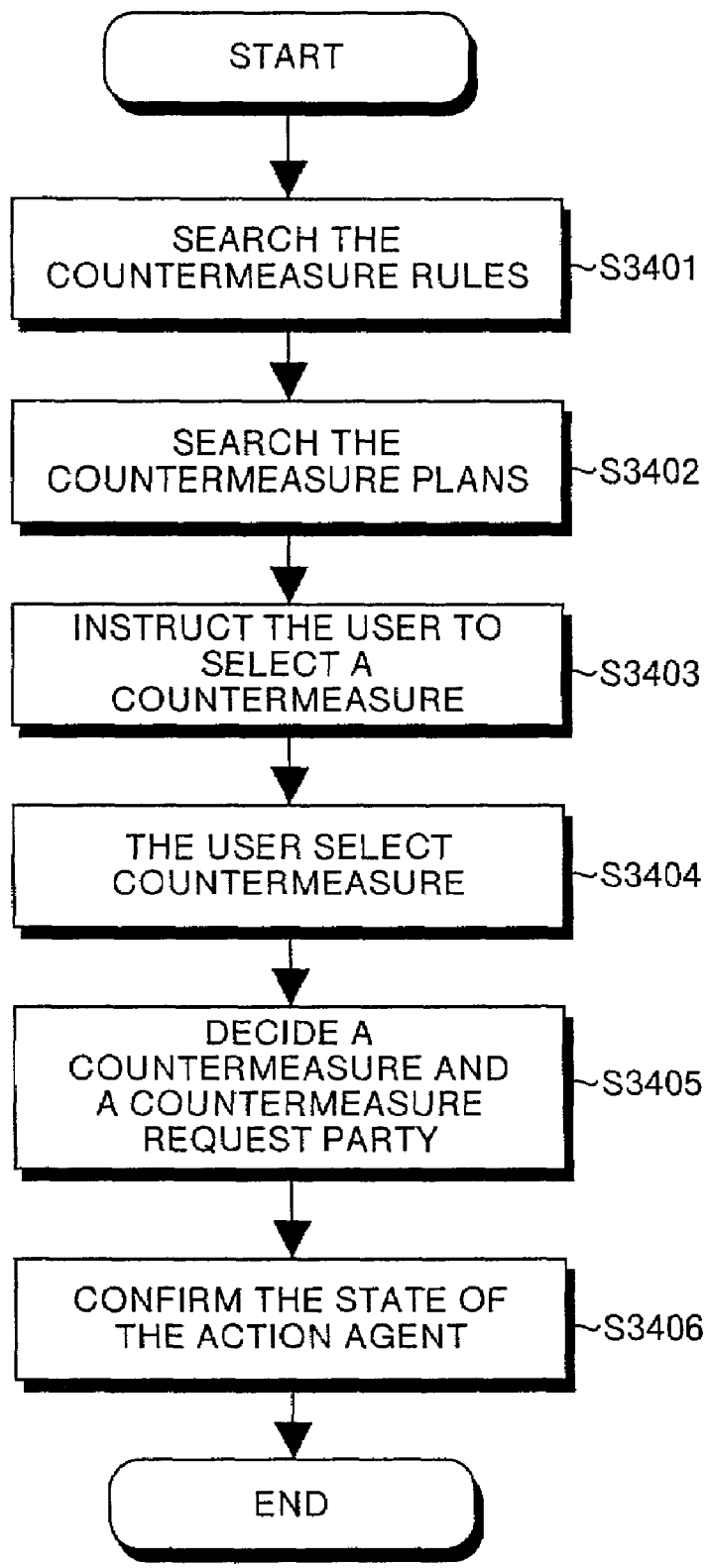
FIG. 34 is a flow chart showing the procedure up to the countermeasure decision by the countermeasure decision section shown in FIG. 30.

Next, operations of the countermeasure decision section 2906 shown in FIG. 30 is explained further in detail. FIG. 34 is a flow chart showing the procedure until a countermeasure decision by the countermeasure decision section 2906 shown in FIG. 30.

As shown in the chart, the control manager 202 refers to the countermeasure rules to acquire "threat identifier" (step S3401) and refers to the countermeasure plans to acquire "countermeasure identifier" (step S3402).

Then, When the countermeasure identifier is an OR coupling, the control manager 202 requests a user to select a countermeasure (step S3403), and the user selects a countermeasure (step S3404). Thereafter, the control manager 202 decides a countermeasure and a countermeasure request party (step S3405) and confirms the operation state of the action agent 204 (step S3406).

Figure 35:
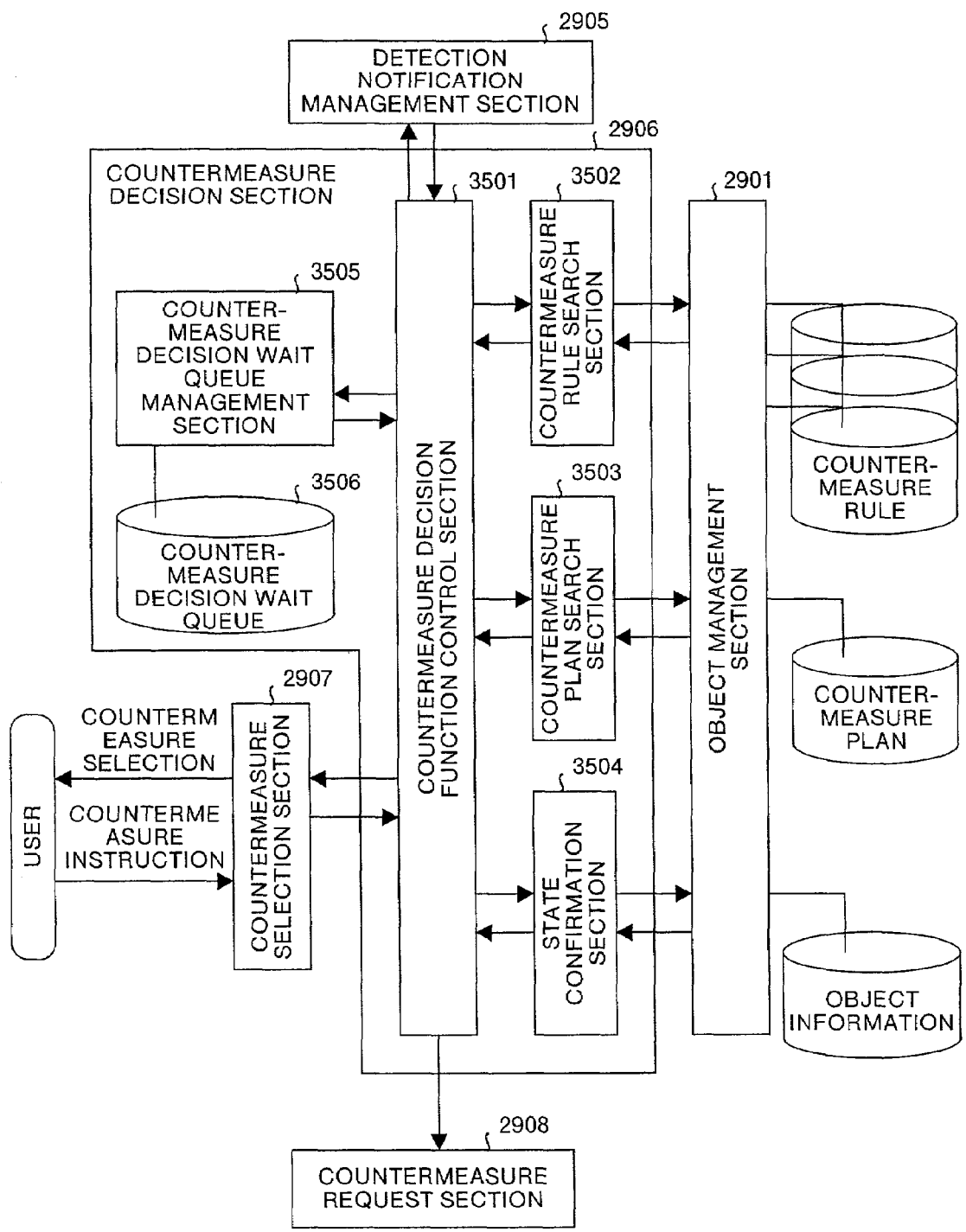
FIG. 35 is a functional block diagram showing the configuration of the countermeasure decision section shown in FIG. 30.

Next, the configuration of the countermeasure decision section 2906 shown in FIG. 30 is explained. FIG. 35 is a functional block diagram showing the configuration of the countermeasure decision section 2906 shown in FIG. 30. As shown in the drawing, this countermeasure decision section 2906 lies among the detection notification management section 2905, the object management section 2901, the countermeasure request section 2908, and the countermeasure selection section 2907 and is composed of a countermeasure decision function control section 3501, a countermeasure rule search section 3502, a countermeasure plan search section 3503, a state confirmation section 3504, a countermeasure decision wait queue management section 3505, and a countermeasure decision wait queue 3506.

The countermeasure decision function control section 3501 is a function section controlling a countermeasure decision function, the countermeasure rule search section 3502 is a function section searching the countermeasure rules, the countermeasure plan search section 3503 is a function section searching the countermeasure plans, the state confirmation section 3504 is a function section performing a state confirmation, the countermeasure decision wait queue management section 3505 is a function section managing the countermeasure decision wait queue 3506.

Figure 36:
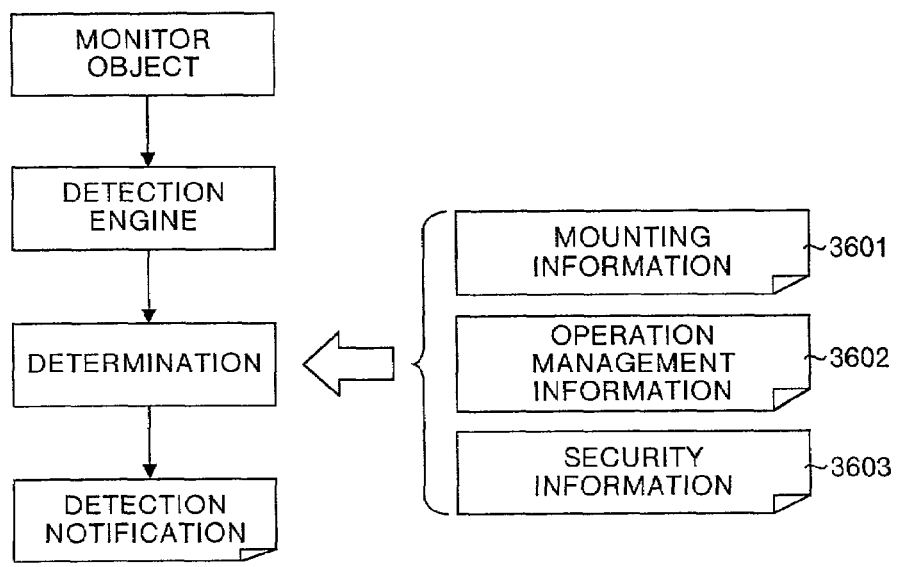
FIG. 36 is an explanatory chart for explaining the reporting function.

Next, a reporting function is explained. FIG. 36 is an explanatory chart for explaining the reporting function. As shown in the drawing, when a monitor object is detected by a detection engine, a determination is made based upon mounting information 3601, operation management information 3602, and security information 3603 to perform a detection notification. That is, based upon information (the configuration, the service during operation, the security function, and the like) of a monitor object site, a diversified operation condition is determined to perform reporting.

Figure 37:
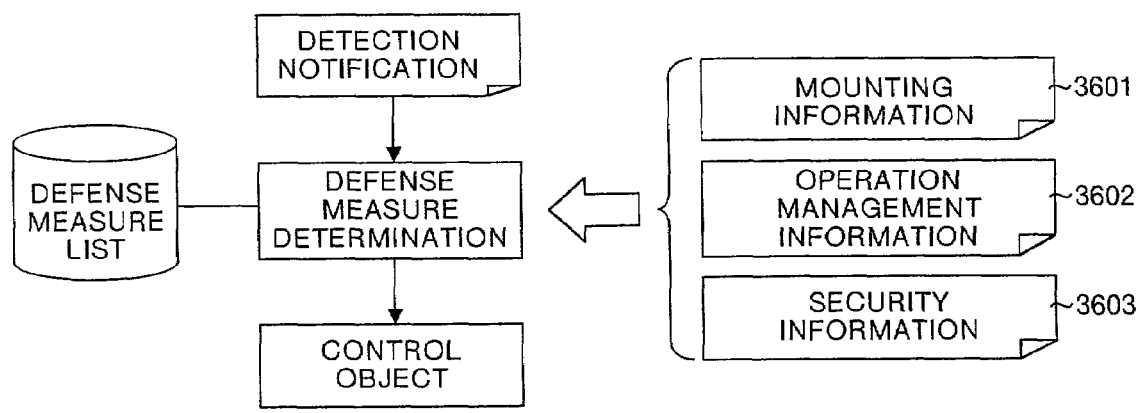

The mounting information 3601, the operation management information 3602, and the security information 3603 are also employed when a defense measure is determined as shown in FIG. 37, and such information is referred to select a defense measure from various angles so that dynamic defense in accordance with the condition is implemented when a defense measure is determined from a defense measure list. Here, based upon which of the mounting information, the operation management information and/or the security information a countermeasure is selected can be setting-changed according to the selection of a user.

Figure 38:
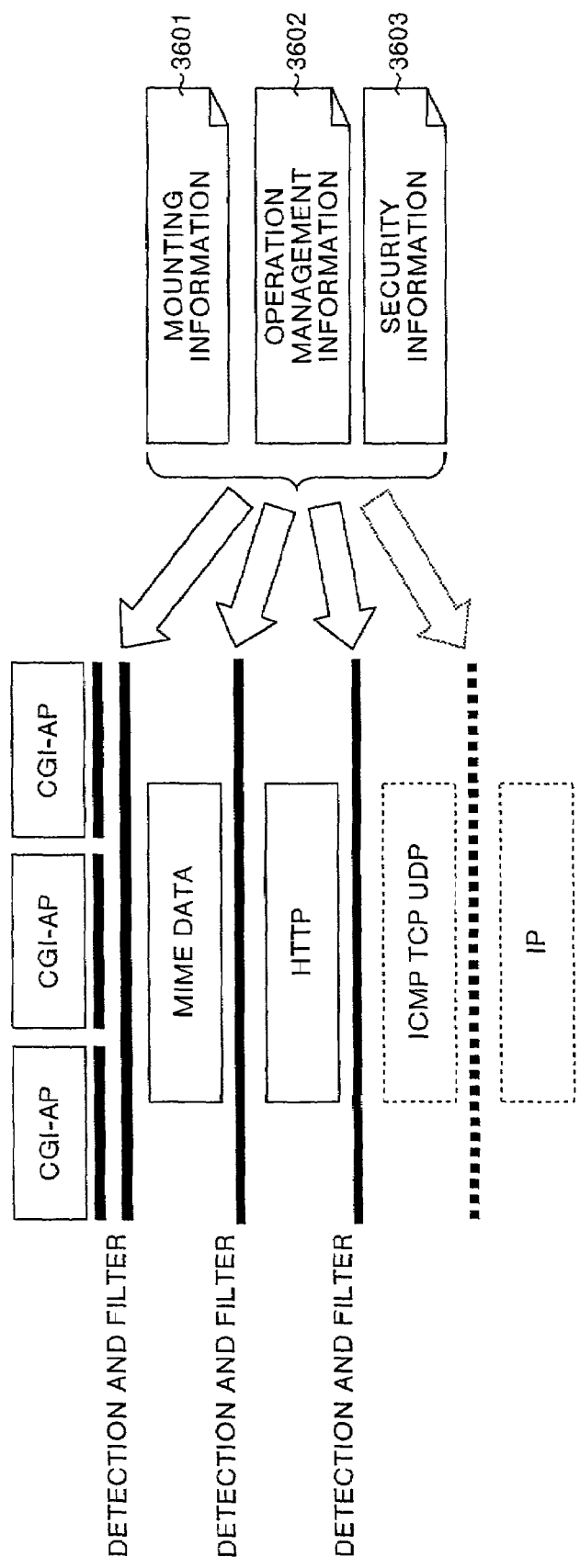
FIG. 38 is an explanatory view for explaining the concept employing the mounting information and the like as filters between protocol hierarchies.

Further, as shown in FIG. 38, the mounting information 3601, the operation management information 3602, and the security information 3603 are utilized as filters between protocol hierarchies. That is, by using each as a filter between an IP layer and a TCP layer, between a TCP layer and an HTTP layer, between an HTTP layer and MIME data, and between MIME data and a CGI-AP, an illegal access way of each hierarchy is limited, and parse and detection cost can be reduced.

By performing filtering so as not to give the one other than a normal request to another layer, defense against an attack can be realized. Further, by referring to information (the system configuration, the operation service, the security function) related to a monitor object, there liability and the validity of the determination process can be improved.

Figure 39:
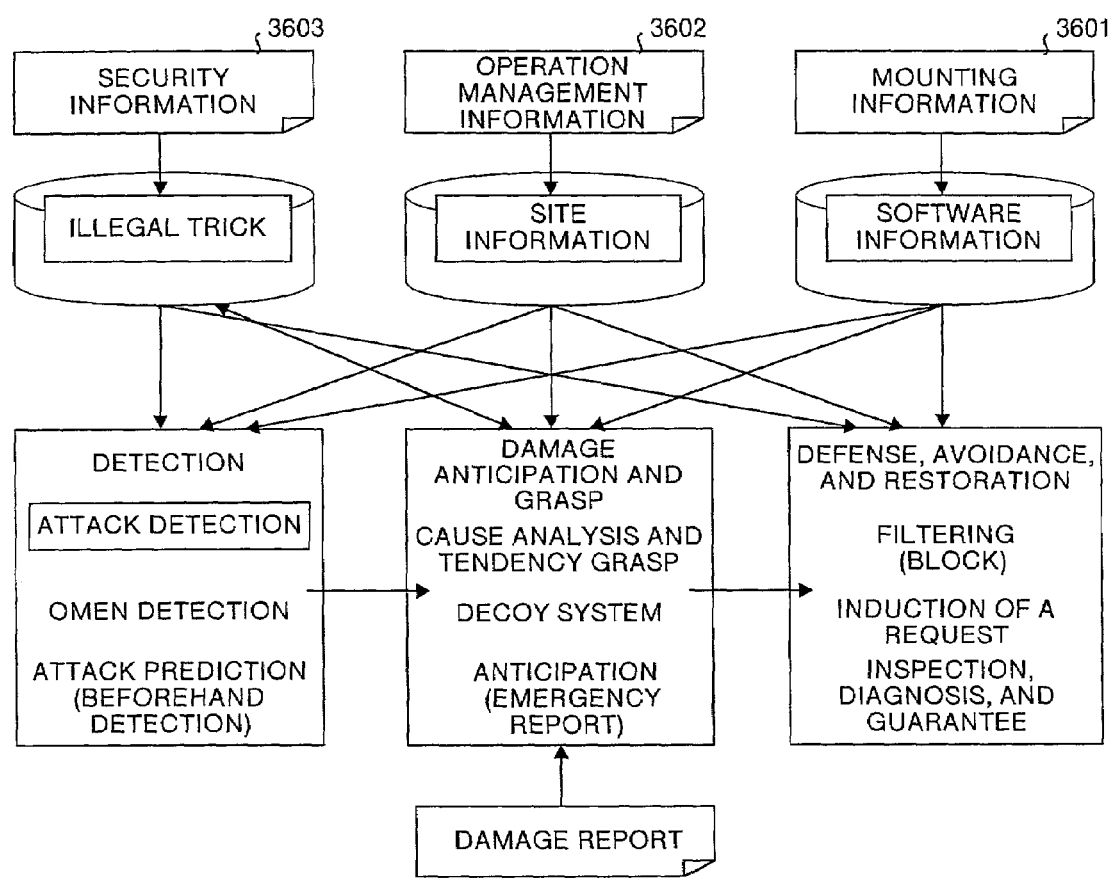
FIG. 39 is an explanatory diagram for explaining the integration cooperation management employing the mounting information, the operation management information, and the security information.

Next, an integration cooperation management employing the mounting information 3601, the operation management information 3602, and the security information 3603 is explained. FIG. 39 is an explanatory diagram for explaining the integration cooperation management employing the mounting information, the operation management information, and the security information.

As shown in the drawing, the security information 3603 is connected with an illegal trick, the operation management information is connected with website information, and the mounting information is connected with soft information. Here, the illegal trick, the website information, and the soft information play an important role when detection, damage anticipation and grasp, and defense, avoidance, and restoration are performed.

In other words, in order to perform detection (attack detection, omen detection, and attack prediction), comprehensive information such as the illegal trick, the website information, and the soft information is necessary, and similar comprehensive information is necessary when the damage anticipation and grasp are performed or when the defense, avoidance, and restoration are performed. Thus, in the present embodiment, the integration cooperation management employing the mounting information 3601, the operation management information 3602, and the security information 3603 is performed.

As described above, according to the present embodiment, the log of an entity is analyzed in the monitor agent 203, and when the omen of abnormality is detected, the omen is notified to the control manager 202. The present embodiment is constructed wherein the control manager 202 decides a countermeasure and a countermeasure request party based upon the database 201 and the like so as to let the action agent 204 that is the countermeasure request party perform a corresponding countermeasure. Thus, the omen of an attack against a website is detected and a countermeasure is performed before an actual attack is started so that damage can be minimized.

As described above, according to the present invention a countermeasure can be implemented efficiently, and thus an appropriate countermeasure is implemented against an actual attack so as to minimize damage.

Furthermore, content of the database can be enriched, and a more appropriate countermeasure can be selected. Furthermore, countermeasure is selected based on a variety of information so that appropriate countermeasure can be implemented and damage can be minimized. Furthermore, a countermeasure can be selected employing time series information in the database. Furthermore, a countermeasure can be selected employing spatial information of the site map. Furthermore, an attack technique by an ill-intentioned person can be grasped. Furthermore, a website deemed as a stepping-stone can be specified efficiently. Furthermore, attack object website can be preserved, and an attack technique can be grasped.

The computer readable recording medium according to the present invention stores a computer program which when executed on a computer realizes the method according to the present invention on a computer. This recording medium any be a floppy disk, CD-ROM, DVD-ROM, built-in or detachable hard disk. On the other hand, the program may be distributed or downloaded over a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system for managing information comprising:
   a communication request monitor unit which monitors a communication request;
   a management unit which selects a countermeasure based upon information notified from the communication request monitor unit;
   a performing unit which performs a countermeasure in response to an instruction from the management unit, wherein said management unit comprises:
      a database which manages a notification content from the communication request monitor unit and the countermeasure that the performing unit performs such that the notification content and the countermeasure correspond to each other, and
      a selection unit which selects the countermeasure from various angles based upon the database and mounting information, operation information, and/or security information to be performed;
      an information collection unit which collects information related to a kind, a content, an order, and a time interval of two or more communications in a progress process of an attack event or a leakage event, such that the information is collected through an attack caused by induction through a vulnerability manifested in a decoy server, so that the collected information is analyzed to be recognized as an attack pattern to be used to predict a future attack which may occur; and
      a reflection unit which reflects the information collected and regulated by the information collection unit upon the database, to thereby predict a possible attack event or a leakage event in advance, and to avoid the predicted attack event or leakage event before execution of the predicted attack event or leakage event, wherein the information notified by the communication request monitor unit and/or countermeasure selected by the management unit are weighted.

2. The system according to claim 1, wherein based upon which of the mounting information, the operation management information and/or the security information a countermeasure is selected can be setting-changed according to the selection of a user.

3. The system according to claim 1, wherein a weight coefficient for the weighting can be arbitrarily set by a user.

4. The system according to claim 1, wherein a weight coefficient for the weighting is set based upon the mounting information, operation management information and/or security information.

5. The system according to claim 1, further comprising a site map formation unit which forms a site map representing a spatial arrangement of a website based upon the information notified by the plural communication request monitor unit.

6. The system according to claim 1, further comprising a monitor condition notification unit which notifies the communication request monitor unit of the kind and/or time of a communication to be a monitor object based upon a site map formed by a site map formation unit.

7. The system according to claim 1, further comprising:
   a vulnerability present unit which provides vulnerability of the system; and
   the information collection unit which collects information related to an attack the vulnerability presented by the vulnerability present unit.

8. The system according to claim 1, further comprising an investigation unit investigating an outgoing source of a communication content and a determination unit which determines whether or not a website is made a stepping-stone by an ill-intentioned person based upon an investigation result by the investigation unit.

9. The system according to claim 1, further comprising a decoy unit leading a communication to a location different from an attack object to avoid an attack.

10. The system according to claim 1, wherein the communication request monitor unit, management unit, and the performing unit are provided in plurality.

11. The system according to claim 10, wherein the communication request monitor units, management units, and the performing units cooperate with each other between the same type or different types thereof to exchange information.

12. The system according to claim 10, further comprising a site map formation unit which forms a site map representing a spatial arrangement of a website based upon the information notified by the plural communication request monitor unit.

13. The system according to claim 10, further comprising a monitor condition notification unit which notifies the communication request monitor unit of the kind and/or time of a communication to be a monitor object based upon a site map formed by a site map formation unit.

14. The system according to claim 1, wherein the database holds information notified by the communication request monitor unit in time series, and the selection unit selects a countermeasure based upon the time series information stored in the database.

15. The system according to claim 14, further comprising a site map formation unit which forms a site map representing a spatial arrangement of a website based upon the information notified by the plural communication request monitor unit.

16. The system according to claim 14, further comprising a monitor condition notification unit which notifies the communication request monitor unit of the kind and/or time of a communication to be a monitor object based upon the a site map formed by the site map formation unit.

17. The system according to claim 1, wherein the management unit gives a request to a website existing in a network and automatically updates the database based upon information replied in response to the request.

18. The system according to claim 17, wherein the request is performed at a user's suggestion.

19. The system according to claim 1, wherein the management unit automatically updates the database based upon information automatically transmitted from a website existing in a network.

20. The system according to claim 19, wherein the information automatically transmitted from a website existing in a network is taken in the database in response to a request of a user.

21. A method of managing information comprising:
monitoring a communication request by a communication request monitor unit;
selecting, via a management unit, a countermeasure from various angles based upon a database and mounting information, operation management information, and/or security information, wherein the database manages a notification content notified by the communication request monitor step and a countermeasure to be performed such that the notification content and the countermeasure correspond to each other; and
performing, via a performing unit, the countermeasure selected in response to an instruction from the management unit;
collecting information related to a kind, a content, an order, and a time interval of two or more communications in a progress process of an attack event or a leakage event, such that the information is collected through an attack caused by induction through a vulnerability manifested in a decoy server, so that the collected information is analyzed to be recognized as an attack pattern to be used to predict a future attack which may occur; and
reflecting the information collected and regulated by the information collection step upon the database, to thereby predict a possible attack event or a leakage event in advance, and to avoid the predicted attack event or leakage event before execution of the predicted attack event or leakage event, wherein the information notified by the communication request monitor unit and/or countermeasure selected by the management unit are weighted.

22. The method according to claim 21, wherein based upon which of the mounting information, the operation management information and/or the security information a countermeasure is selected and can be setting-changed according to the selection of a user.

23. The method according to claim 21, wherein a weight coefficient for the weighting can be arbitrarily set by a user.

24. The method according to claim 21, wherein a weight coefficient for the weighting is set based upon the mounting information, operation management information and/or security information.

25. The method according to claim 21, further comprising forming a site map representing a spatial arrangement of a website based upon the information notified by the communication request monitor units.

26. The method according to claim 21, further comprising a notifying the communication request monitor units of the kind and/or time of a communication to be a monitor object based upon a site map formed.

27. The method according to claim 21, further comprising providing vulnerability of the system; and the information collection step collecting information related to an attack against the vulnerability provided.

28. The method according to claim 21, further comprising investigating an outgoing source of a communication content and determining whether a website is made a stepping-stone by an ill-intentioned person based upon an investigation result.

29. The method according to claim 21, further comprising a decoy unit leading a communication to a location different from an attack object to avoid an attack.

30. The method according to claim 21, wherein the communication request monitor unit, management unit, and the performing unit are provided in plurality.

31. The method according to claim 30, wherein the respective plurality of communication request monitor units, management units, and performing units cooperate with each other between the same type or different types thereof to exchange information.

32. The method according to claim 30, further comprising forming a site map representing a spatial arrangement of a website based upon the information notified by the communication request monitor units.

33. The method according to claim 30, further comprising notifying the communication request monitor units of the kind and/or time of a communication to be a monitor object based upon a site map formed.

34. The method according to claim 21, wherein the database holds information notified by the communication request monitor unit in time series, and a countermeasure is selected based upon the time series information stored in the database.

35. The method according to claim 34, further comprising forming a site map representing a spatial arrangement of a website based upon the information notified by the communication request monitor units.

36. The method according to claim 34, further comprising a notifying the communication request monitor units of the kind and/or time of a communication to be a monitor object based upon a site map formed.

37. The method according to claim 21, wherein the management unit gives a request to a website existing in a network and automatically updates the database based upon information replied in response to the request.

38. The method according to claim 37, wherein the request is performed in response to a request of a user.

39. The method according to claim 21, wherein the management unit automatically updates the database based upon information automatically transmitted from a website existing in a network.

40. The method according to claim 39, wherein the database is automatically update based on the information transmitted from a website existing in a network in response to a request of a user.

41. A computer readable medium read by a computer and encoded with a program that when executed by the computer causes the computer to perform a method comprising:

monitoring communication requests:

outputting a notification in case of an abnormality;

selecting a countermeasure from various angles based upon a database and mounting information, operation management information, and/or security information, wherein the database manages a content of the notification and a corresponding countermeasure;

performing a coutermeasure against the abnormality based on the selected countermeasure;

collecting information related to a kind, a content, an order, and a time interval of two or more communications in a proceeding process of an attack event or a leakage event, such that the information is collected through an attack caused by induction through a vulnerability manifested in a decoy server, so that the collected information is analyzed to be recognized as an attack pattern to be used to predict a future attack which may occur; and reflecting the information collected and regulated by the information collected upon the database, to thereby predict a possible attack event or a leakage event in advance, and to avoid the predicted attack event or leakage event before execution of the predicted attack event or leakage event.

* * * * *

UNITED STATES PATENT AND TRADEMARK OFFICE
CERTIFICATE OF CORRECTION

PATENT NO. : 7,412,721 B2 Page 1 of 1
APPLICATION NO. : 09/955972
DATED : August 12, 2008
INVENTOR(S) : Satoru Torii et al.

It is certified that error appears in the above-identified patent and that said Letters Patent is hereby corrected as shown below:

Column 21, Line 15, after "upon" delete "the".

Column 23, Line 8, change "requests:" to --requests;--.

Column 23, Line 15, change "coutermeasure" to --countermeasure--.

Signed and Sealed this

Eleventh Day of November, 2008

JON W. DUDAS
*Director of the United States Patent and Trademark Office*